US008675958B2

(12) United States Patent
Abe

(10) Patent No.: US 8,675,958 B2
(45) Date of Patent: Mar. 18, 2014

(54) SUBJECT DETERMINATION METHOD, COMPUTER PROGRAM PRODUCT FOR DETERMINING SUBJECT, AND CAMERA

(75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 229 days.

(21) Appl. No.: 13/046,334

(22) Filed: Mar. 11, 2011

(65) Prior Publication Data
US 2012/0014592 A1 Jan. 19, 2012

(30) Foreign Application Priority Data

Mar. 19, 2010 (JP) ................................ 2010-063718
Feb. 1, 2011 (JP) ................................ 2011-020076

(51) Int. Cl.
*G06K 9/00* (2006.01)
(52) U.S. Cl.
USPC ........ 382/165; 382/106; 382/274; 348/223.1; 358/520
(58) Field of Classification Search
USPC ......... 382/106, 165, 274; 348/223.1; 358/520
See application file for complete search history.

(56) References Cited

U.S. PATENT DOCUMENTS 7,246,041 B2 * 7/2007 Fukuda et al. ................ 702/189
7,340,443 B2 * 3/2008 Dugan et al. .................... 706/52
8,254,630 B2 * 8/2012 Abe .............................. 382/103
2009/0278958 A1 * 11/2009 Bregman-Amitai et al. ........................ 348/231.99
2011/0007947 A1 * 1/2011 Abe .............................. 382/106

FOREIGN PATENT DOCUMENTS

| JP | A-6-225328 | 8/1994 | |
| JP | A-2000-278584 | 10/2000 | |
| JP | A-2004-205885 | 7/2004 | |
| JP | A-2007-158941 | 6/2007 | |
| JP | A-2011-19177 | 1/2011 | |
| WO | WO2007/125866 | * 11/2007 | ................ G06T 7/00 |

OTHER PUBLICATIONS

Japanese Office Action issued in Japanese Application No. 2011-020076 dated Jun. 12, 2012 (with translation).

* cited by examiner

*Primary Examiner* — Chan S Park
*Assistant Examiner* — Eueng-Nan Yeh
(74) *Attorney, Agent, or Firm* — Oliff PLC

(57) ABSTRACT

A photographic subject determination method includes: a binarization step of creating a plurality of binarized images of a subject image, based upon color information or luminance information in the subject image; an evaluation value calculation step of, for each of the plurality of binarized images, calculating an evaluation value that is used for specifying at least one of a position, a size, and a shape of a photographic subject within the subject image; and a photographic subject specification step of specifying at least one of the position, the size, and the shape of a photographic subject within the subject image, based upon the evaluation value.

16 Claims, 34 Drawing Sheets

FIRST RANKED

25a

SECOND RANKED

25b

US 8,675,958 B2

SUBJECT DETERMINATION METHOD, COMPUTER PROGRAM PRODUCT FOR DETERMINING SUBJECT, AND CAMERA

INCORPORATION BY REFERENCE

The disclosures of the following priority applications are herein incorporated by reference: Japanese Patent Application No. 2010-063718 filed Mar. 19, 2010, and Japanese Patent Application No. 2011-020076 filed Feb. 1, 2011.

BACKGROUND OF THE INVENTION

1. Field of the Invention

The present invention relates to a photographic subject determination method, to a program product for photographic subject determination, and to a camera.

2. Description of Related Art

An image-capturing device of the following type is per se known. This image-capturing device specifies the position of a photographic subject on the basis of an AF area selected by the user, and performs processing for focus adjustment upon this specified subject (refer to Japanese Laid-Open Patent Publication 2004-205885).

SUMMARY OF THE INVENTION

However, with a prior art image-capturing device, it has not been possible to specify the position or the size or the shape of the photographic subject on the basis of the AF area selected by the user.

According to the 1st aspect of the present invention, a photographic subject determination method comprises: a binarization step of creating a plurality of binarized images of a subject image, based upon color information or luminance information in the subject image; an evaluation value calculation step of, for each of the plurality of binarized images, calculating an evaluation value that is used for specifying at least one of a position, a size, and a shape of a photographic subject within the subject image; and a photographic subject specification step of specifying at least one of the position, the size, and the shape of a photographic subject within the subject image, based upon the evaluation value.

According to the 2nd aspect of the present invention, a photographic subject determination method comprises: a binarization step of creating a plurality of binarized images of a subject image, based upon color difference information, luminance information, and color difference space information combined with the color difference information, in the subject image; an evaluation value calculation step of, for each of the plurality of binarized images, calculating an evaluation value that is used for specifying at least one of a position, a size, and a shape of a photographic subject within the subject image; and a photographic subject specification step of specifying at least one of the position, the size, and the shape of a photographic subject within the subject image, based upon the evaluation value.

According to the 3rd aspect of the present invention, in the photographic subject determination method according to the 1st aspect, it is preferred that the evaluation value includes a first evaluation value that is calculated based upon an area of a white pixel region that is made up by white pixels within a binarized image, and a value that shows a state of a set of white pixels within the white pixel region.

According to the 4th aspect of the present invention, in the photographic subject determination method according to the 3rd aspect, it is preferred that the evaluation value includes at least one of a second evaluation value that is calculated based upon an area of an enveloping rectangle that envelopes the set of the white pixels within the binarized image and an area of the set of the white pixels, a third evaluation value that is calculated based upon an aspect ratio of the enveloping rectangle, and a fourth evaluation value that is calculated based upon a size of a region that includes a face of a person.

According to the 5th aspect of the present invention, in the photographic subject determination method according to the 4th aspect, it is preferred that in the photographic subject specification step, from among the plurality of white pixel regions, some of the white pixel regions are eliminated based upon the second evaluation value, the third evaluation value, and the fourth evaluation value, and, from among remaining ones of the white pixel regions, the white pixel regions whose first evaluation value are large are specified as photographic subject candidates.

According to the 6th aspect of the present invention, in the photographic subject determination method according to the 3rd aspect, it is preferred that the first evaluation value is calculated based upon at least one of the area of the white pixel regions and an inertial moment centered around a photographic subject inferred position within the subject image, an entire area of a screen, and an area of white pixels that do not correspond to the white pixel regions.

According to the 7th aspect of the present invention, in the photographic subject determination method according to the 3rd aspect, it is preferred that the value that shows the state of the set of white pixels within the white pixel region is the area of the white pixel region and an inertial moment around a photographic subject inferred position within the image, and the photographic subject inferred position is either a position designated by a user, or a position in which a face of a photographic subject has been detected.

According to the 8th aspect of the present invention, in the photographic subject determination method according to the 7th aspect, it is preferred that, the photographic subject determination method further comprises an inferring step of inferring a position of an upper half of a body of the photographic subject and a position of a lower half of the body of the photographic subject, based upon the position in which the face of the photographic subject has been detected.

According to the 9th aspect of the present invention, in the photographic subject determination method according to the 8th aspect, it is preferred that in the inferring step, a plurality of positions of the upper half of the body of the photographic subject and a plurality of positions of the lower half of the body of the photographic subject are inferred.

According to the 10th aspect of the present invention, in the photographic subject determination method according to the 8th aspect, it is preferred that in the photographic subject specification step, at least one of the position, the size, and the shape of the photographic subject is specified by combining the white pixel region that corresponds to the position of the upper half of the body of the photographic subject and the white pixel region that corresponds to the position of the lower half of the body of the photographic subject.

According to the 11th aspect of the present invention, in the photographic subject determination method according to the 5th aspect, it is preferred that in the photographic subject specification step, at least one of the position, the size, and the shape of the photographic subject is specified by combining each of white pixel regions that are produced by combining a plurality of candidates, among the photographic subject candidates, whose first evaluation values are large.

According to the 12th aspect of the present invention, in the photographic subject determination method according to the 1st aspect, it is preferred that in the photographic subject specification step, at least one of the position, the size, and the shape of the photographic subject is specified by combining a first white pixel region that corresponds to an inferred photographic subject position, and a second white pixel region whose ranging target point is closest to the first white pixel region and that is close thereto upon a screen.

According to the 13th aspect of the present invention, in the photographic subject determination method according to the 1st aspect, it is preferred that: hue is classified into a plurality of subdivisions; and for each subdivision of the plurality of subdivisions into which hue has been classified, a binarized image is created by binarizing the subject image according to pixels that correspond to a corresponding subdivision, and pixels that do not correspond to the corresponding subdivision, so that a plurality of binarized images that are created correspond to the plurality of subdivisions of hue.

According to the 14th aspect of the present invention, in the photographic subject determination method according to the 6th aspect, it is preferred that: a luminance image and a color difference image are created based upon luminance information and color information in the subject image; and binarized images are created for the luminance image and the color difference image that have been created to be included in the plurality of binarized images.

According to the 15th aspect of the present invention, a photographic subject determination method according to the 2nd aspect, it is preferred that: a luminance image, a first color difference image, and a second color difference image are created based upon luminance information and color information in the subject image; binarized images are created for the luminance image, the first color difference image, and the second color difference image that have been created to be included in the plurality of binarized images; and a color difference space achieved by a first color difference of the first color difference image and a second color difference of the second color difference image is subdivided into a plurality of color difference space subdivisions, and the plurality of binarized images are created by creating binarized images corresponding to the color difference space subdivisions, using the first color difference image and the second color difference image.

According to the 16th aspect of the present invention, a computer-readable computer program product comprises a program that causes a computer to execute a photographic subject determination method according to the 1st aspect.

According to the 17th aspect of the present invention, a computer-readable computer program product comprises a program that causes a computer to execute a photographic subject determination method according to the 2nd aspect.

According to the 18th aspect of the present invention, a camera comprises a control unit that performs a photographic subject determination method according to the 1st aspect.

According to the 19th aspect of the present invention, a camera comprises a control unit that performs a photographic subject determination method according to the 2nd aspect.

DESCRIPTION OF THE PREFERRED EMBODIMENTS

-Embodiment One-

Figure 1:
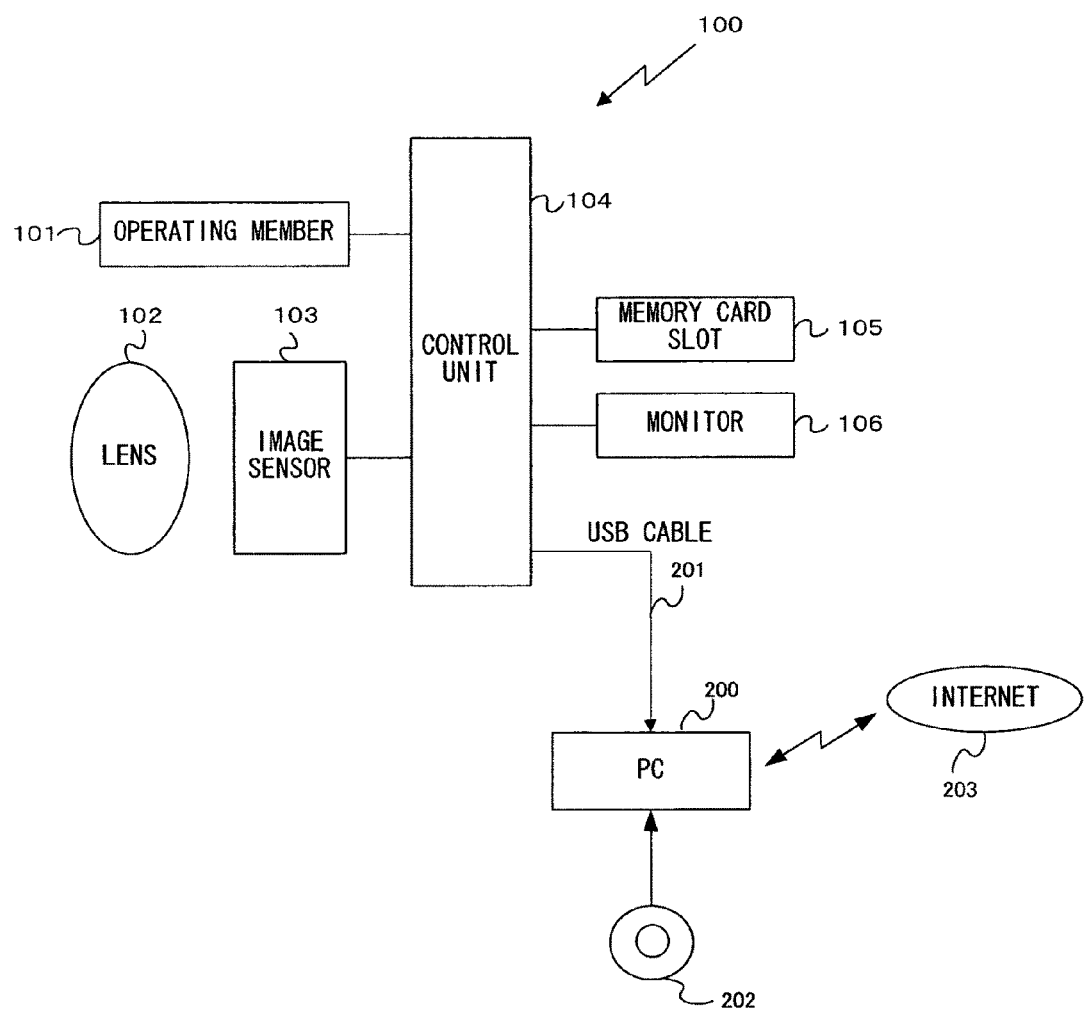
FIG. 1 is a block diagram showing the structure of a camera according to an embodiment of the present invention, along with a PC to which the camera is connected.

FIG. 1 is a block diagram showing the structure of a camera according to an embodiment of the present invention, along with a PC to which the camera is connected. This camera 100 includes operating members 101, a lens 102, an imaging sensor 103, a control unit 104, a memory card slot 105, and a monitor 106. The operating members 101 include various input members that are actuated by the user, for example a power supply button, a release button, a zoom button, a cruciform key, a confirm button, a replay button, a delete button, and so on.

Although the lens 102 actually consists of a plurality of optical lenses, only one lens is shown in FIG. 1 as a representative. The imaging sensor 103 is, for example, a CCD or a CMOS type image sensor or the like, and captures an image of a photographic subject that is imaged by the lens 102. And the imaging sensor 103 outputs an image signal to the control unit 104 based upon this captured image.

On the basis of the imaging signal that is inputted from the imaging sensor 103, the control unit 104 creates image data in a predetermined image format, for example in the JPEG format (hereinafter this will be termed the "basic image data"). Moreover, on the basis of this image data that has been created, the control unit 104 creates image data for display, for example thumbnail image data. And the control unit 104 outputs to the memory card slot 105 an image file that includes the basic image data and the thumbnail image data that have thus been created, with further header information being appended to this file. In this embodiment, it will be supposed that both the basic image data and the thumbnail image data are image data expressed in the RGB color system.

The memory card slot 105 is a slot for insertion of a memory card (not shown in the figures) that serves as a storage medium; the image file outputted from the control unit 104 is recorded by being written upon this memory card. Moreover, according to a command from the control unit 104, the memory card slot 105 can be employed for reading in an image file that is stored upon the memory card.

The monitor 106 is a liquid crystal monitor that is mounted upon the rear surface of the camera 100 (in other words, a rear surface monitor), and images stored upon the memory card and setting menus for setting the camera 100 and so on are displayed upon this monitor 106. Moreover, when the operating mode of the camera 100 is set to photographic mode by the user, the control unit 104 outputs image data for displaying images acquired from the imaging sensor to the monitor 106 in time series. Due to this, a so-called through image (live view image) is displayed upon the monitor 106.

The control unit 104 includes a CPU and other peripheral circuitry thereof, and performs overall control of the camera 100. It should be understood that SDRAM and flash memory are included in the memory included in the control unit 104. SDRAM is volatile memory and is used as work memory for holding a program during program execution by the CPU, and is also used as buffer memory for temporarily storing data. Moreover, flash memory is non-volatile memory, and is used for recording the program executed by the control unit 104, data for this program, and various parameters and so on that are read in during program execution.

The program that is executed by the control unit 104 is stored in the flash memory, as described above, during production in the factory. However, as shown in FIG. 1, it would also be possible to connect the camera 100 to a personal computer 200 via a USB cable 201, and to download the program from the personal computer 200. In this case, this program could be supplied to the personal computer 200 via a recording medium such as a CD-ROM 202 or the like that is loaded into the personal computer 200, or as a data signal via the internet 203 or the like. Moreover, it would also be acceptable to arrange for the program to be stored on a memory card, and to be downloaded into the camera 100 from the memory card via the memory card slot 105.

Since the control unit 104 is built as a CPU or the like, the program that is supplied in this manner is a computer-readable computer program product. In this way, the program may be supplied to the camera 100 as a computer-readable computer program product in any of various formats, such as upon a non-volatile recording medium or as a data signal (including a signal carried upon a carrier wave) or the like.

Figure 2:
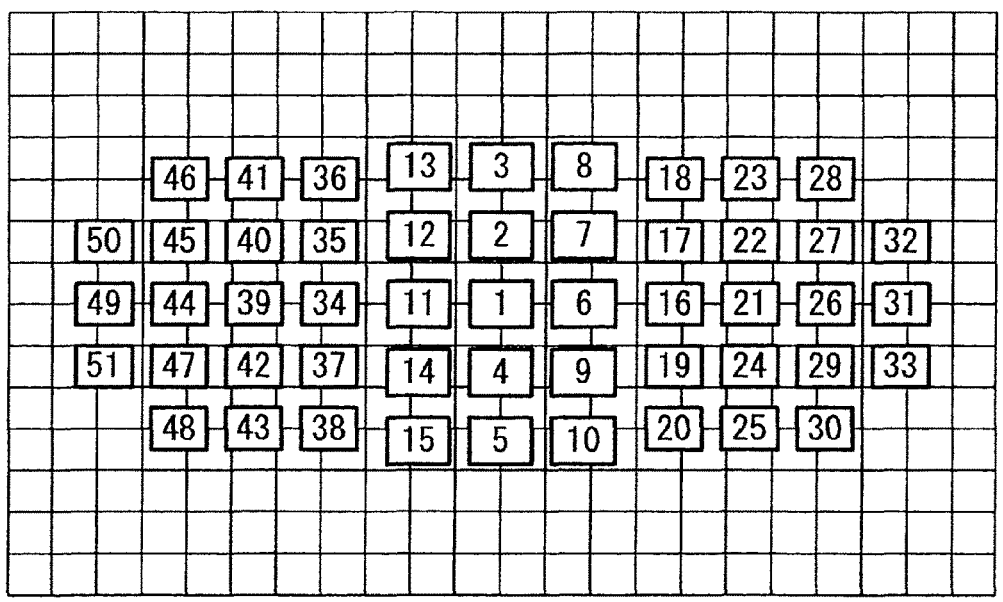
FIG. 2 is a figure schematically showing a position in which an area sensed by an AF sensing sensor is located upon a photographic scene.

In this embodiment, the control unit 104 not only specifies the position of the photographic subject within the image on the basis of the position of the AF area within the image and on the basis of color information and/or luminance information, but also specifies the position, the size, and the shape of that photographic subject. It should be understood that by the position of the AF area, is meant the position of the AF area that was selected during photography for use for focus detection. For example in this embodiment, as shown in FIG. 2, 51 AF areas are set upon the photographic scene as a two dimensional array, and corresponds to the various arranged positions of AF sensing sensors. And the control unit 104 displays upon the monitor 106 a plurality of proposed AF areas that are close to the position of the photographic subject within the image. When the user selects, from among these proposed AF areas, that AF area that he has decided is closest to the position of the photographic subject, then focusing is performed upon this selected AF area using focus adjustment processing (AF processing) of a per se known type.

Moreover, in this embodiment, among the color information in the image, the hue is used as information for specifying the position, the size, and the shape of the photographic subject. Due to this, the control unit 104 first converts the RGB values for each pixel within the subject image for which the photographic subject position is to be specified, to hue angle, using the following Equation (1):

$$H = \begin{cases} 60 \times \frac{G-B}{MAX-MIN} + 0, & \text{if } MAX = R \\ 60 \times \frac{B-R}{MAX-MIN} + 120, & \text{if } MAX = G \\ 60 \times \frac{R-G}{MAX-MIN} + 240, & \text{if } MAX = B \end{cases} \quad \text{Hue Conversion} \quad (1)$$

if $H < 0$ then $H = H + 180$

Figure 3:
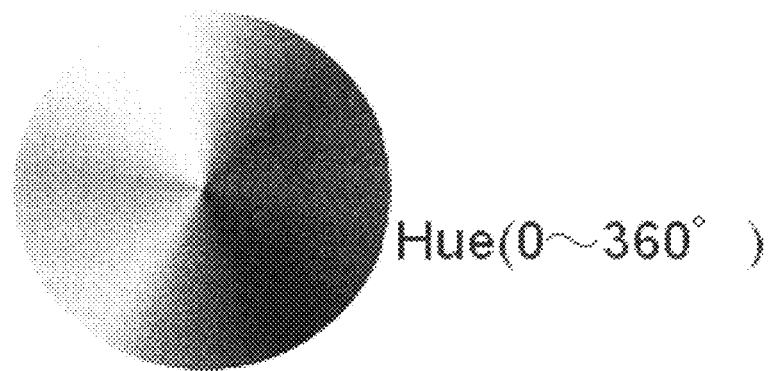
FIG. 3 is a figure showing a hue circle.

It should be understood that the hue is expressed according to the hue circle (color wheel) shown in FIG. 3, and that the hue angle of each pixel is the angle of its hue upon this hue circle.

Figure 4A:
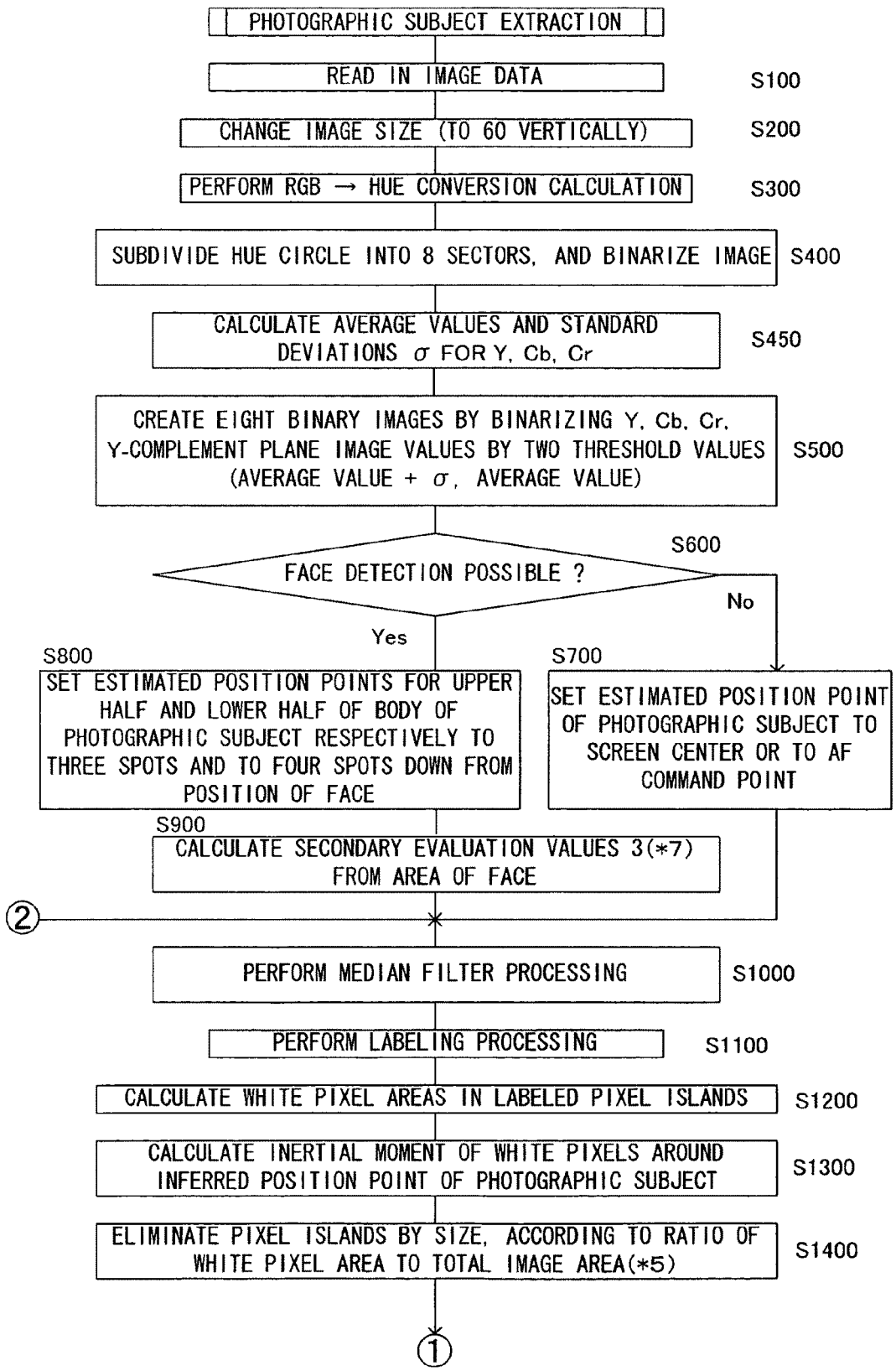
FIG. 4A and 4B is a flow chart showing a flow of processing for photographic subject extraction, in a first embodiment.
Figure 4B:
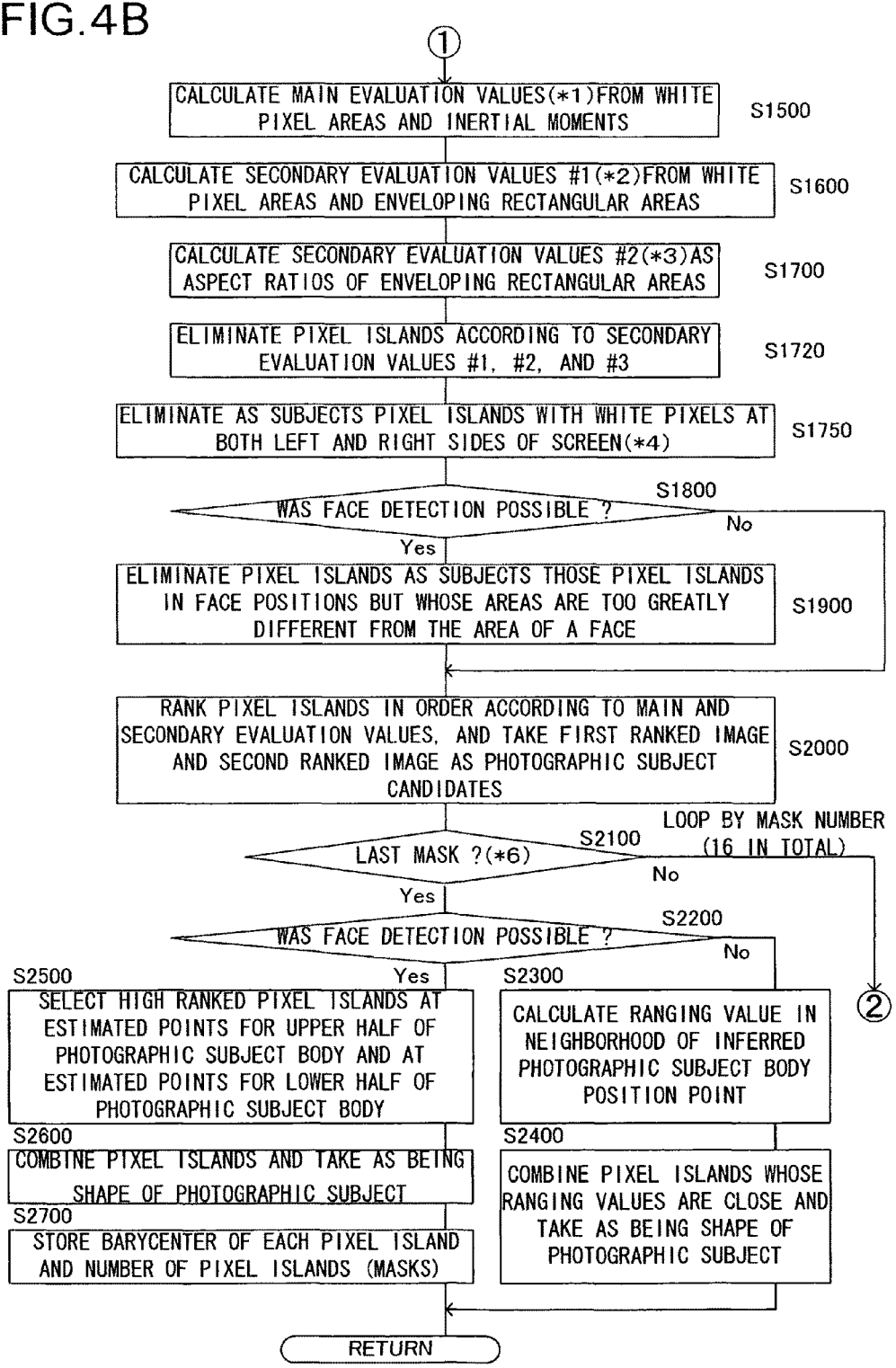

In the following, the processing in this embodiment for extraction of the photographic subject that has been the subject of focus adjustment will be explained using the flow chart shown in FIG. 4. It should be understood that the processing shown in FIG. 4 is executed by the control unit 104 as a program that starts when input of image data from the imaging sensor 103 is started. In this embodiment, as will be described hereinafter, the details of the processing for an image in which detection of a face of a photographic subject is possible, and the details of the processing for an image in which detection of a face of a photographic subject is not possible, are different. Thus, in the following, explanation of the processing for an image in which it is possible to detect a face of a photographic subject will be explained using the image shown in FIG. 5 as an example, while explanation of the processing for an image in which it is not possible to detect any face of a photographic subject will be explained using the image shown in FIG. 6 as an example.

In a first step S100, the control unit 104 reads in the image data inputted from the imaging sensor 103, and then the flow of control proceeds to a step S200. In this step S200, the control unit 104 reduces the size of the image data that has been read in so as to enhance the subsequent processing speed. It should be understood that, if the control unit 104 has sufficient processing capability, then it would be acceptable for this step S200 not to be performed. Next the flow of control proceeds to a step S300, in which, as described above, the control unit 104 converts the RGB values in the subject image to hue angles, using Equations (1) as described above. Next the flow of control proceeds to a step S400.

In this step S400, the control unit 104 subdivides the hue circle shown in FIG. 3 into eight sectors (subdivisions), each of angular width 45°. Due to this, the hue circle is divided into a first sector where 0°≤hue<45°, a second sector where 45°≤hue<90°, a third sector where 90°≤hue<135°, a fourth sector where 135°≤hue<180°, a fifth sector where 180°≤hue<225°, a sixth sector where 225°≤hue<270°, a seventh sector where 270°≤hue<315°, and an eighth sector where 315°≤hue<360°.

Figure 7:
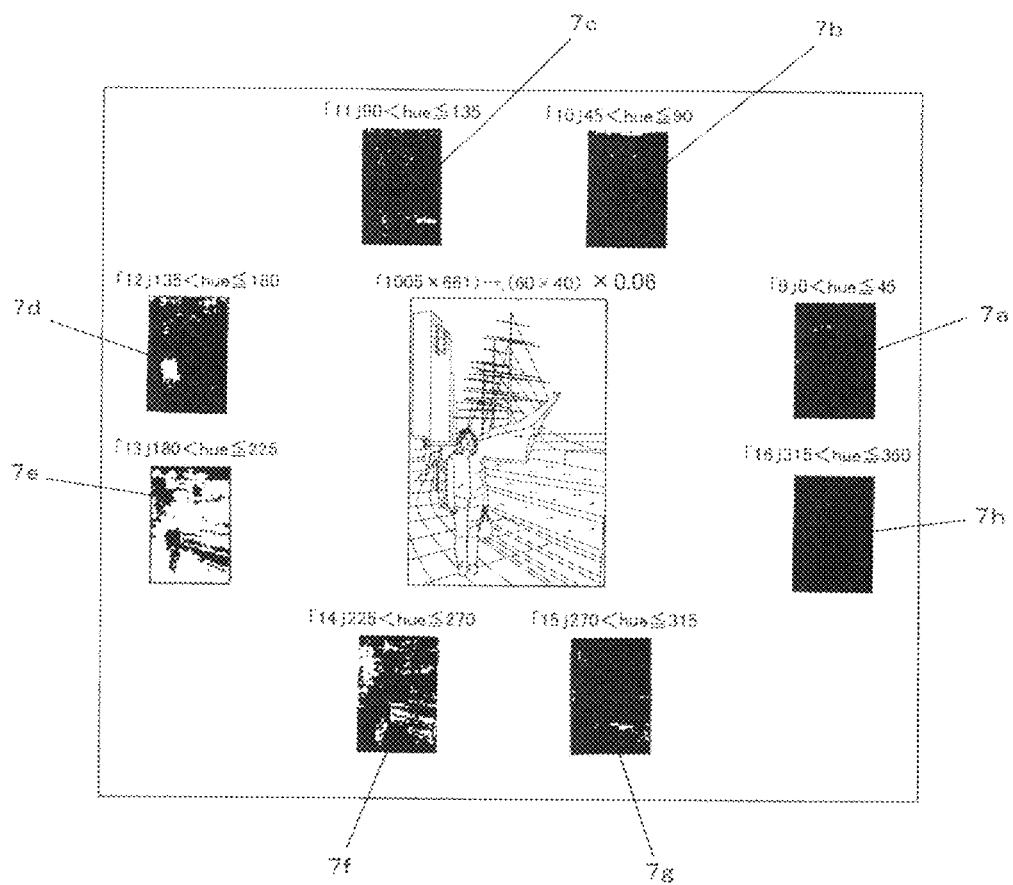
FIG. 7 is a figure showing a concrete example in which the hue circle has been subdivided into eight sectors on the basis of hue, and eight binarized images have been created from the subject image, one for each sector.

And, in each of the sectors, the control unit 104 binarizes each pixel within the image on the basis of the hue angle of corresponding sector. In other words, for each of the eight sectors, the control unit 104 generates a mask image by converting those pixels in the image that have hue within the angular range of that sector into white pixels, while converting the other pixels into black pixels. Due to this, for example for the image of the photographic subject shown in FIG. 5, eight mask images are created as shown in FIG. 7: a mask image 7a for the first sector, a mask image 7b for the second sector, ..., a mask image 7h for the eighth sector.

Then the flow of control proceeds to a step S450, in which the control unit 104 converts the subject image to an image in the YCbCr format, and generates each of a image for the Y component (a Y plane image), an image for the Cr component (a Cr plane image), and an image for the Cb component (a Cb plane image). Moreover, the control unit 104 inverts the white and black pixels in the Y plane image to generate a Y-complement plane image. In concrete terms, using the following Equations (2) through (4), the control unit 104 converts the subject image that is expressed in the RGB color system into a luminance image that consists of the luminance component (i.e. the Y component) and color difference (chrominance) images that consist of the color difference (chrominance) components (the Cb component and the Cr component) in the YCbCr color space.

In other words, for the subject image, the control unit 104 creates a luminance image as a Y plane image that consists of the Y component using the following Equation (2), and creates a color difference image that consists of the Cb component and a color difference image that consists of the Cr component as a Cb plane image and a Cr plane image respectively, using the following Equations (3) and (4):

$$Y = 0.299R + 0.587G + 0.114B \quad (2)$$

$$Cb = -0.169R - 0.332G + 0.500B \quad (3)$$

$$Cr = 0.500R - 0.419G - 0.081B \quad (4)$$

And for each of the Y plane image, the Cb plane image, the Cr plane image, and the Y-complement plane image that have thus been created, the control unit 104 compares the density values of each pixel in the images and calculates the average of the density values and the standard deviation of the density; and then the flow of control proceeds to a step S500.

Figure 8:
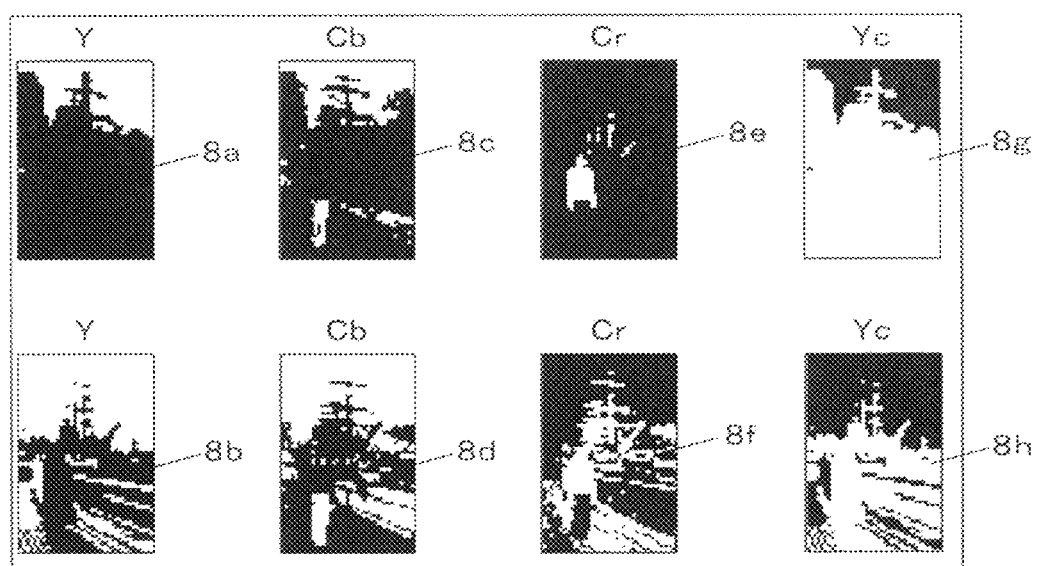
FIG. 8 is a figure showing a concrete example when two binarized images have been created from each of a Y plane image, a Cb plane image, a Cr plane image, and a Y-complement image.

In this step S500, the control unit 104 creates four first binarized images by binarizing the pixels of the Y plane image, the Cb plane image, the Cr plane image, and the Y-complement plane image respectively by the corresponding average values, and four second binarized images by binarizing the pixels of each of these images are binarized by the corresponding average values plus one standard deviation. Due to this, for example for the image of the photographic subject shown in FIG. 5, as shown in FIG. 8, a first binarized image 8a and a second binarized image 8b are created for the Y plane image, a first binarized image 8c and a second binarized image 8d are created for the Cb plane image, a first binarized image 8e and a second binarized image 8f are created for the Cr plane image, and a first binarized image 8g and a second binarized image 8h are created for the Y-complement plane image.

Then the flow of control proceeds to a step S600, in which the control unit 104 performs face detection processing using an inbuilt face detection function, and makes a decision as to whether or not any face has been detected within the subject image. For example, the control unit 104 may perform per se known face recognition processing upon the subject image, and the result will be a decision as to whether or not any face of a person has been detected within the subject image. If a negative decision is reached in this step S600, in other words if, as shown in the FIG. 6 example, the subject image is an image in which it is not possible to detect any human face, then the flow of control proceeds to a step S700. In this step S700, the center position within the subject image, or the focus adjustment position (i.e. the AF position) within the subject image, is set as the inferred position of the photographic subject (i.e. as the inferred position point of the photographic subject), and then the flow of control is transferred to a step S1000 that will be described hereinafter.

Figure 5:
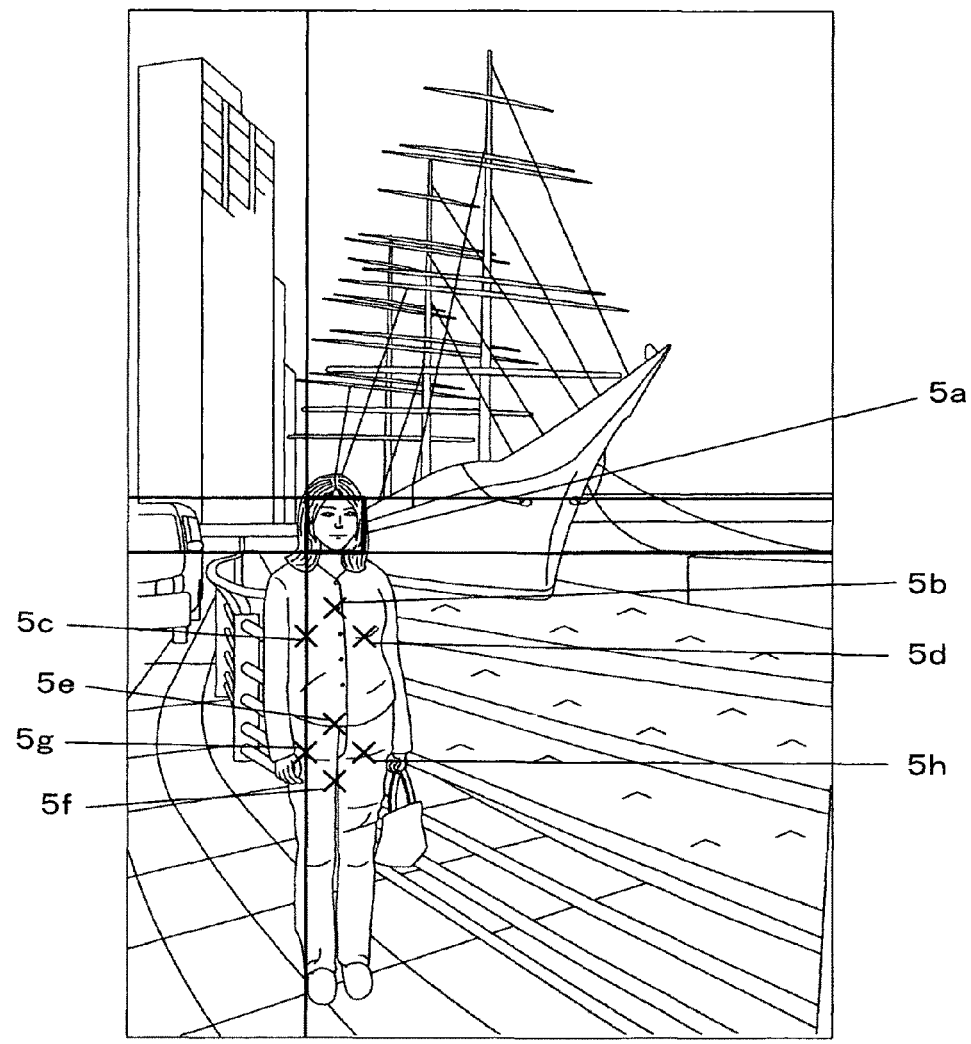
FIG. 5 is a figure showing a first concrete example of an image of a photographic subject.
Figure 6:
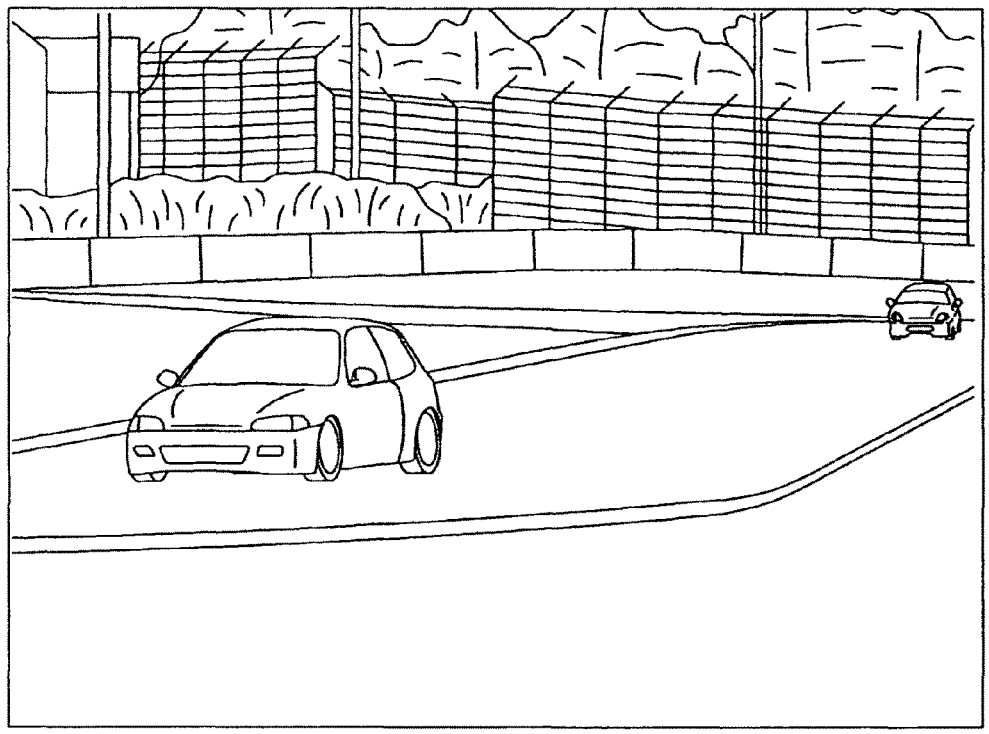
FIG. 6 is a figure showing a second concrete example of an image of a photographic subject.

By contrast, if an affirmative decision is reached in the step S600, in other words if, as shown in the FIG. 5 example, the subject image is an image in which it is possible to detect a human face, then the flow of control is transferred to a step S800. In this step S800, as shown in FIG. 5, the control unit 104 specifies the region 5a that includes the face that has been detected by the above face detection processing, and estimates the position of the upper half of the body of the photographic subject and the position of the lower half of his or her body on the basis of the size of the region 5a that has thus been specified.

For example the control unit 104 may estimate, as being the position of the upper half of the body of the photographic subject, the following three points: a point 5b that is shifted from the center of the specified region 5a in the downwards direction by a predetermined distance, and points 5c and 5d at a predetermined distance in the downwards direction from the vertical framing lines that surround the region 5a. Moreover the control unit 104 may estimate, as being the position of the lower half of the body of the photographic subject, the following four points: points 5e and 5f that are shifted from the above described point 5b in the downwards direction by predetermined distances, a point 5g that is shifted from the above described point 5c in the downwards direction by a predetermined distance, and a point 5h that is shifted from the above described point 5d in the downwards direction by a predetermined distance. In this manner, the estimated points 5b through 5d for the position of the upper half of the body of the photographic subject within the image and the estimated points 5e through 5h for the position of the lower half of his or her body within the image are set. It should be understood that, in this embodiment, the estimated points 5b through 5d for the position of the upper half of the body of the photographic subject will be termed the "inferred position points of the photographic subject".

Then the flow of control proceeds to a step S900, in which the control unit 104 calculates evaluation values that are used by the subsequent processing on the basis of the area of the region 5a that has been specified by the face recognition processing above. For example, the control unit 104 may calculate two evaluation values by multiplying the area of the region 5a by predetermined multiples, for example by 0.5 and 2.0. It should be understood that the evaluation values that are calculated here will be termed the "secondary evaluation values #3", in order to distinguish them from other evaluation values that are calculated by the subsequent processing. Then the flow of control proceeds to a step S1000.

Figure 9:
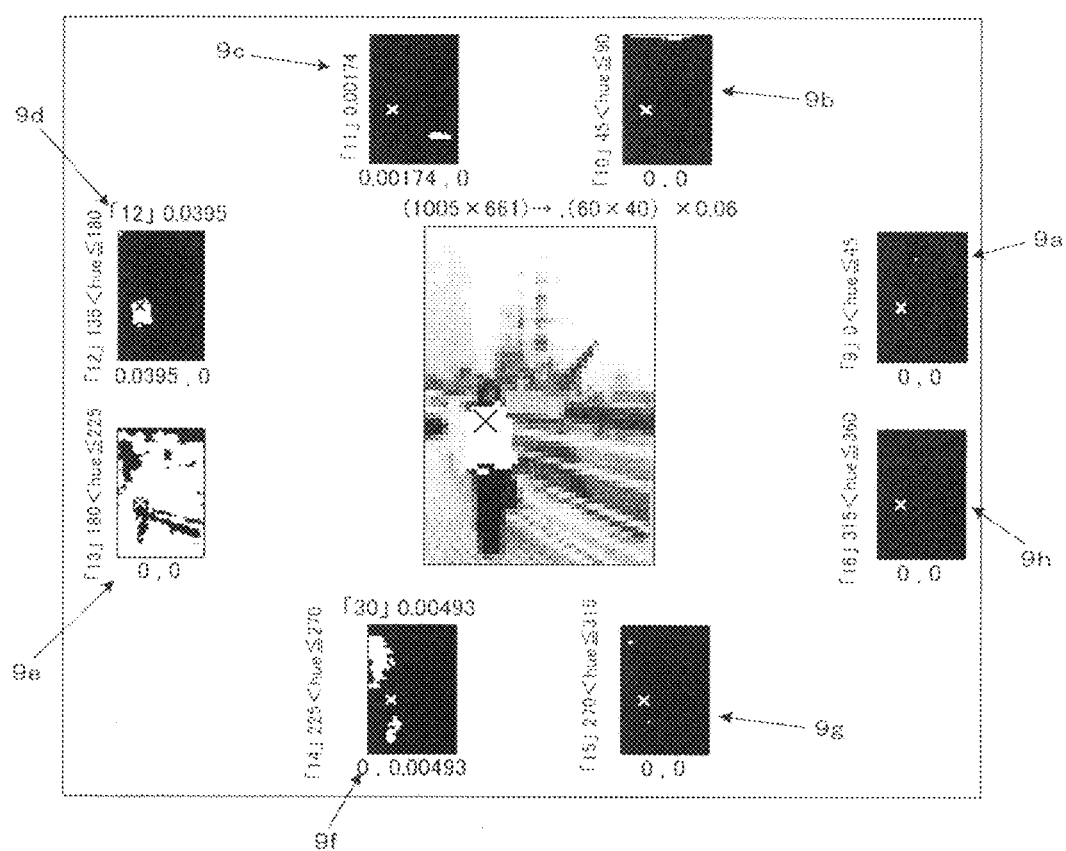
FIG. 9 is a first figure showing a case in which noise elimination has been performed upon a set of binarized images.
Figure 10:
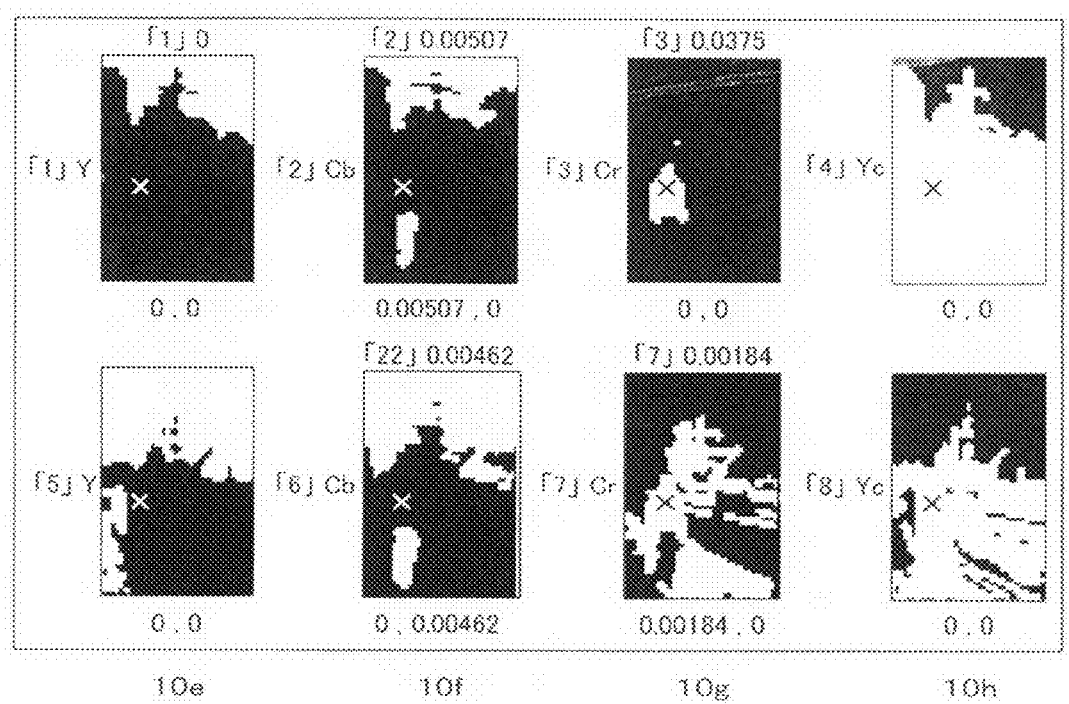
FIG. 10 is a second figure showing a case in which noise elimination has been performed upon a set of binarized images.

In the step S1000, the control unit 104 selects one from the sixteen binarized images shown in FIGS. 7 and 8, and performs noise elimination upon this selected binarized image using a median filter. For example, the binary images shown in FIG. 9 may be obtained as the result of performing noise elimination upon the images shown in FIG. 7, and the binary images shown in FIG. 10 may be obtained as the result of performing noise elimination upon the images shown in FIG. 8. Subsequent processing is executed upon this binarized image for which noise elimination has been performed.

The flow of control then proceeds to a step S1100, in which the control unit 104 performs labeling processing upon the binarized image selected in the step S1000 and for which noise elimination has been performed. In concrete terms, the control unit 104 performs this labeling processing as follows. First, the control unit 104 extracts unified sets of white pixels and unified sets of black pixels from within the binarized image as being labeling regions, and, among these extracted labeling regions, detects those labeling regions that consist of white pixels as being pixel islands.

Then the flow of control proceeds to a step S1200, in which the control unit 104 calculates the area of each of the pixel islands that have been detected within the binary image, and then the flow of control proceeds to a step S1300. In this step S1300, the control unit 104 takes a pixel island that has been detected within the binarized image as a subject, and calculates the inertial moment of this pixel island by taking the inferred position point of the photographic subject that was set in the step S700 or in the step S800 as a center, (i.e., the inertial moment of its white pixels around the barycenter). It should be understood that, while detailed explanation of the method by which the inertial moment in the binarized image is calculated is herein omitted since it is per se conventional, for example, it would be possible to calculate this inertial moment by summing the squares of the pixel distances from the inferred position point of the photographic subject multiplied by (0 or 1). Then the flow of control proceeds to a step S1400.

In the step S1400 the control unit 104 eliminates, from within the binarized image, pixel islands that are larger than some fixed size, for example pixel islands the ratio of whose area to that of the entire binarized image is 60% or greater, and pixel islands that are smaller than some fixed size, for example pixel islands the ratio of whose area to that of the entire binarized image is 1% or less. After this the flow of control proceeds to a step S1500, in which the control unit 104 takes as subjects the pixel islands that remain as the result of elimination in the step S1400, and, calculates a "main evaluation value" for each pixel island used for specifying the position of the photographic subject within the subject image and also for specifying the position, the size, and the shape of the photographic subject in the subject image, on the basis of the inertial moment of the white pixels around the barycenter calculated in the step S1300, according to the following Equation (5):

main evaluation value=number of white pixels constituting the pixel island/moment of inertia of the white pixels around the barycenter as center (5)

Then the flow of control proceeds to a step S1600, in which the control unit 104 sets, for each of the pixel islands, an enveloping rectangle that encloses that pixel island, and then calculates a "secondary evaluation value #1" for each of the pixel islands according to the following Equation (6):

secondary evaluation value #1=white pixel area/area of enveloping rectangle (6)

Figure 11:
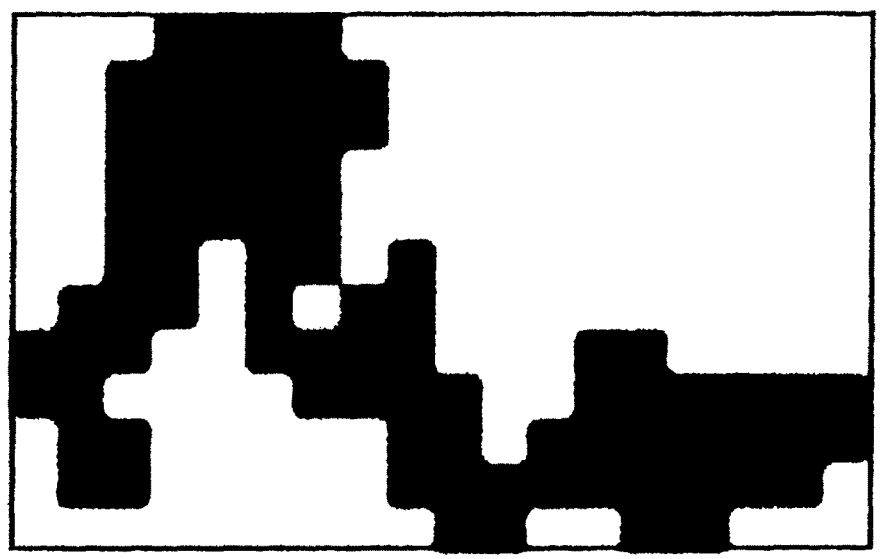
FIG. 11 is a figure showing a concrete example of a pixel island that is eliminated due to a secondary evaluation value #1.

These secondary evaluation values #1 are values for eliminating pixel islands that have wavy in and out contours or that have a lot of void portions and that therefore are not ones normally found in a photographic subject, such as the pixel island shown by way of example in FIG. 11; and, in a step S1720 that will be described subsequently, if these values are less than or equal to a predetermined threshold value (for example 0.2), then the control unit 104 eliminates these pixel islands from the subjects for subsequent processing.

Then the flow of control proceeds to a step S1700 in which, as evaluation values that are used for eliminating, from among the pixel islands, those ones that are long and narrow and therefore cannot be normal photographic subjects, the control unit 104 calculates for each of the pixel islands, as a "secondary evaluation value #2", the aspect ratio of the rectangular envelope that was set in the step S1600. In the next step S1720 that will be described hereinafter, those pixel islands for which this value is within a predetermined range, for example the range in which it is greater than or equal to 0.2 and less than 5, are taken as ones that are long and narrow so that they cannot be normal photographic subjects, and thus are eliminated as subjects for the subsequent processing. Then the flow of control proceeds to the step S1720.

In this step S1720, the control unit 104 eliminates certain ones of the pixel islands included in the binarized image, using the above described "secondary evaluation values #1" and "secondary evaluation values #2". In other words, as described above, among the various pixel islands, the control unit 104 eliminates subjects for the subsequent processing by eliminating, as photographic subject candidates, those pixel islands for which the "secondary evaluation value #1" is less than or equal to the predetermined threshold value, for example 0.2, and those pixel islands for which the "secondary evaluation value #2" is within the predetermined range, for example that are greater than or equal to 0.2 or less than 5. Then the flow of control proceeds to a step S1750.

Figure 12:
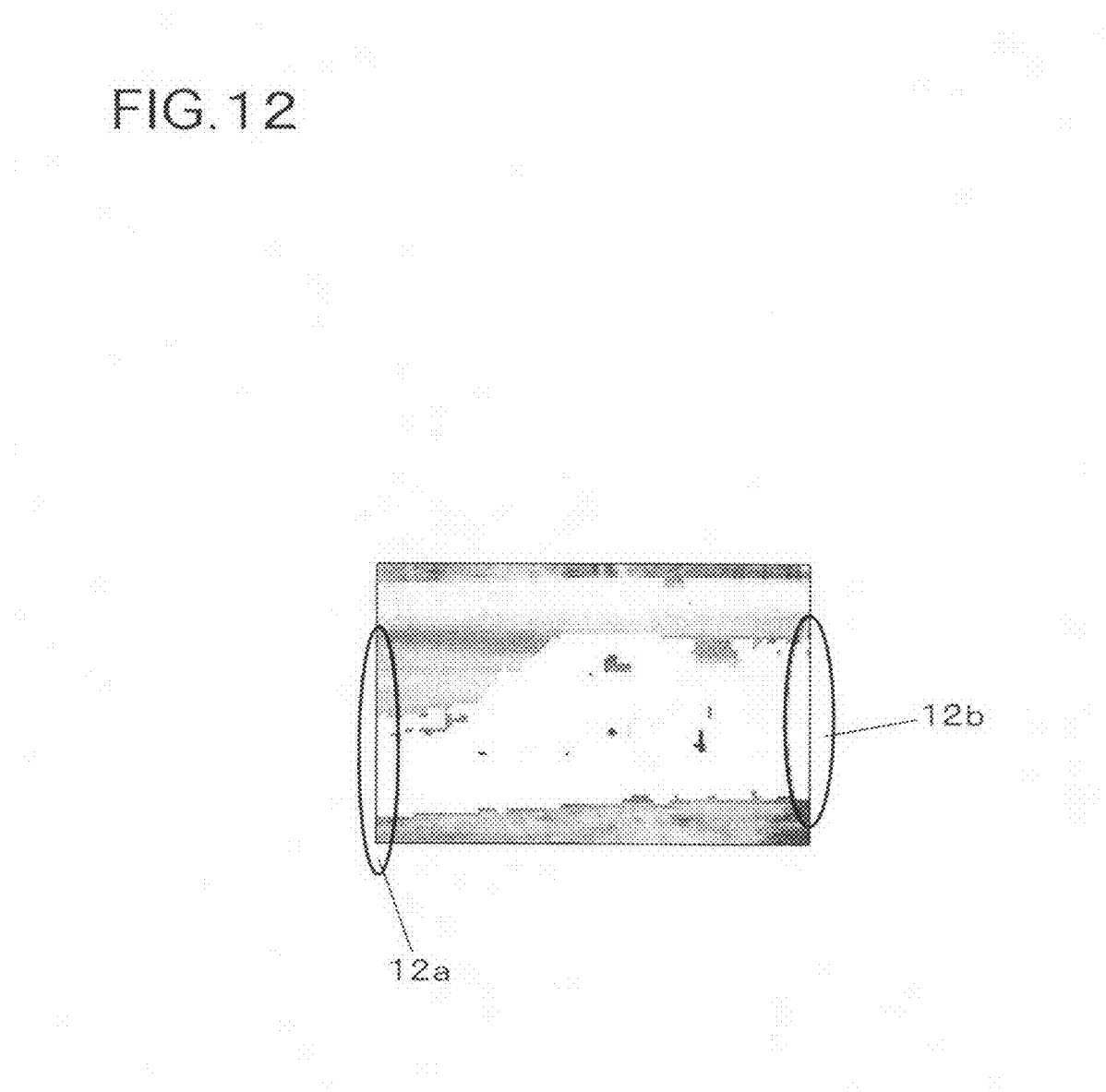
FIG. 12 is a figure showing a concrete example when pixel islands touch the left edge and the right edge of the screen are eliminated as photographic subject candidates.

In the step S1750, the control unit 104 eliminates from the photographic subject candidates those pixel islands that touch the left edge or the right edge of the screen. For example if, as shown in FIG. 12, the number of pixels in a pixel island at either the left edge or the right edge is greater than or equal to ⅓ of the number of pixels vertically, then this pixel island is eliminated. Due to this, in the binarized image shown in FIG. 12, the pixel island 12a that touches the left edge of the image and the pixel island 12b that touches its right edge are both eliminated. Then the flow of control proceeds to a step S1800.

In the step S1800, the control unit 104 makes a decision as to whether or not it was possible to detect a face in the subject image, as the result of the decision in the step S600 described above. If a negative decision is reached in this step S1800, then the flow of control is transferred to a step S2000. By contrast, if an affirmative decision is reached in this step S1800, then the flow of control proceeds to a step S1900. In this step S1900, the control unit 104 eliminates certain ones of pixel islands included in the binarized image, using the secondary evaluation values #3 that were calculated in the step S900. For example, using the two secondary evaluation values #3 calculated by multiplying the area of the region 5a by predetermined magnifications, for example by 0.5 and by 2 as described above, the control unit 104 may eliminate, as photographic subject candidates, those pixel islands whose areas are less than the secondary evaluation value #3 calculated by multiplying the area of the region 5a by 0.5, and those pixel islands whose areas are greater than or equal to the secondary evaluation value #3 calculated by multiplying the area of the region 5a by 2. By doing this, it is possible to eliminate pixel islands that are too big, and pixel islands that are too small, to be capable of being the photographic subject.

Then the flow of control proceeds to the step S2000 in which, taking as subjects the remaining pixel islands from among the pixel islands included in the binarized image after elimination using the secondary evaluation values #1 through #3, the first ranked pixel island for which the main evaluation value is the largest and the second ranked island for which the main evaluation value is the second largest are taken as photographic subject candidates for this binarized image and are extracted, and then the flow of control proceeds to a step S2100. In this step S2100, the control unit 104 decides whether or not the processing from the step S1000 through the step S2000 has been completed for all of the 16 binarized images shown in FIGS. 7 and 8. If a negative decision is reached in this step S2100, then the control unit 104 selects one of the binarized images that has not yet been processed, and repeats the above processing. But if an affirmative decision is reached in this step S2100, then the flow of control proceeds to a step S2200.

Figure 13:
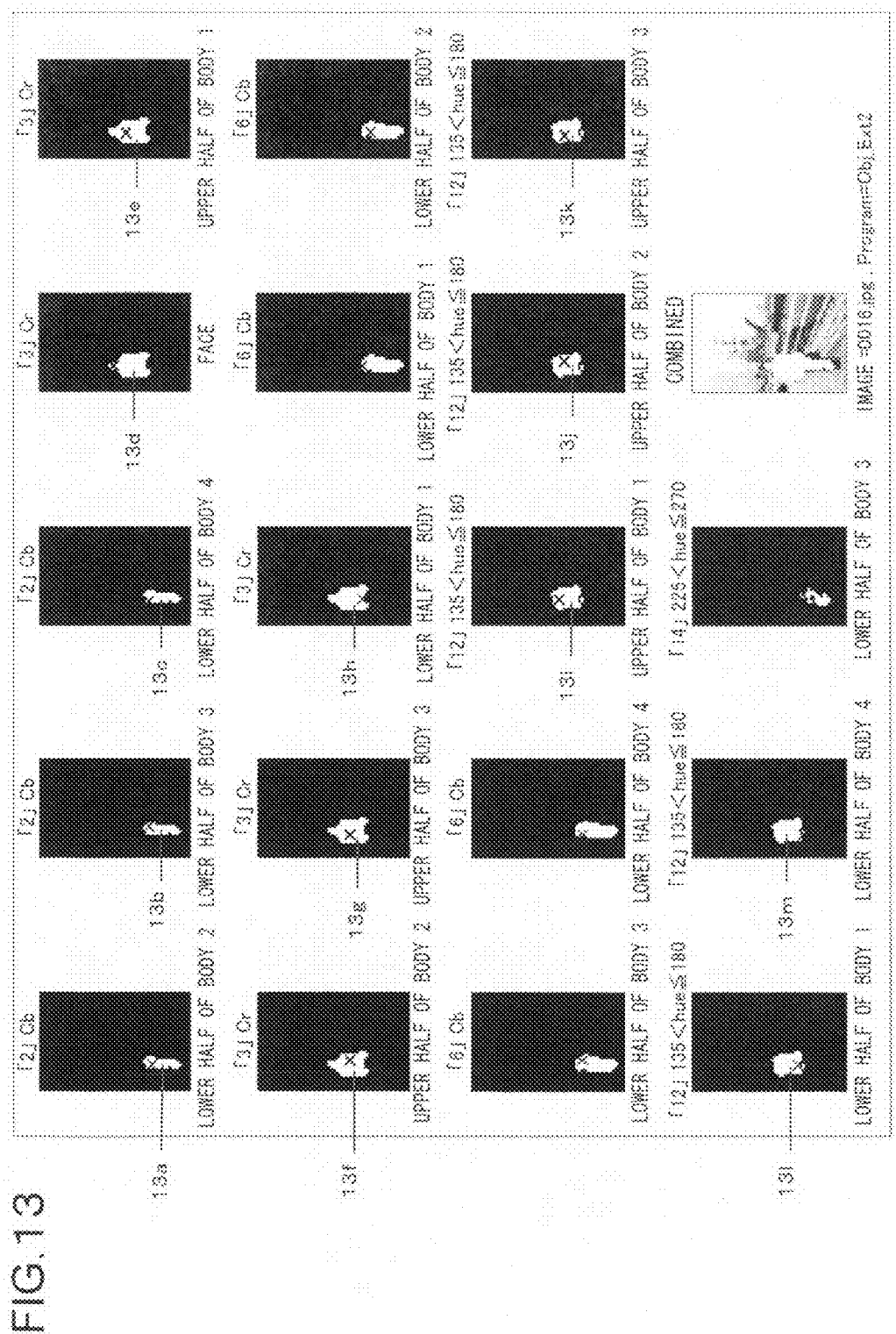
FIG. 13 is a figure showing a concrete example of photographic subject candidates extracted on the basis of a main extraction value.

In this step S2200, the control unit 104 decides, on the basis of the result of the decision in the step S600 described above, whether or not it was possible to detect a face in the subject image. If an affirmative decision is reached in this step S2200, then the flow of control is transferred to a step S2500, in which, for each of the binarized images, the control unit 104 selects from among the photographic subject candidates that were extracted in the step S2000, in other words from the pixel island the magnitude of whose main evaluation value is ranked first and the pixel island the magnitude of whose main evaluation value is ranked second, those pixel islands that respectively correspond to the positions of the three points (the points 5b through 5d) for the upper half of the body and the four points (5e through 5h) for the lower half of the body. Due to this, as for example shown in FIG. 13, the pixel islands 13a through 13c in the binarized image 10b that correspond to the lower half of the body of the photographic subject, the pixel islands 13d through 13h in the binarized image 10c that indicate the upper half of his or her body, and the pixel islands 13i through 13m in the binarized image 9d that indicate the upper half of his or her body, are selected.

Figure 14:
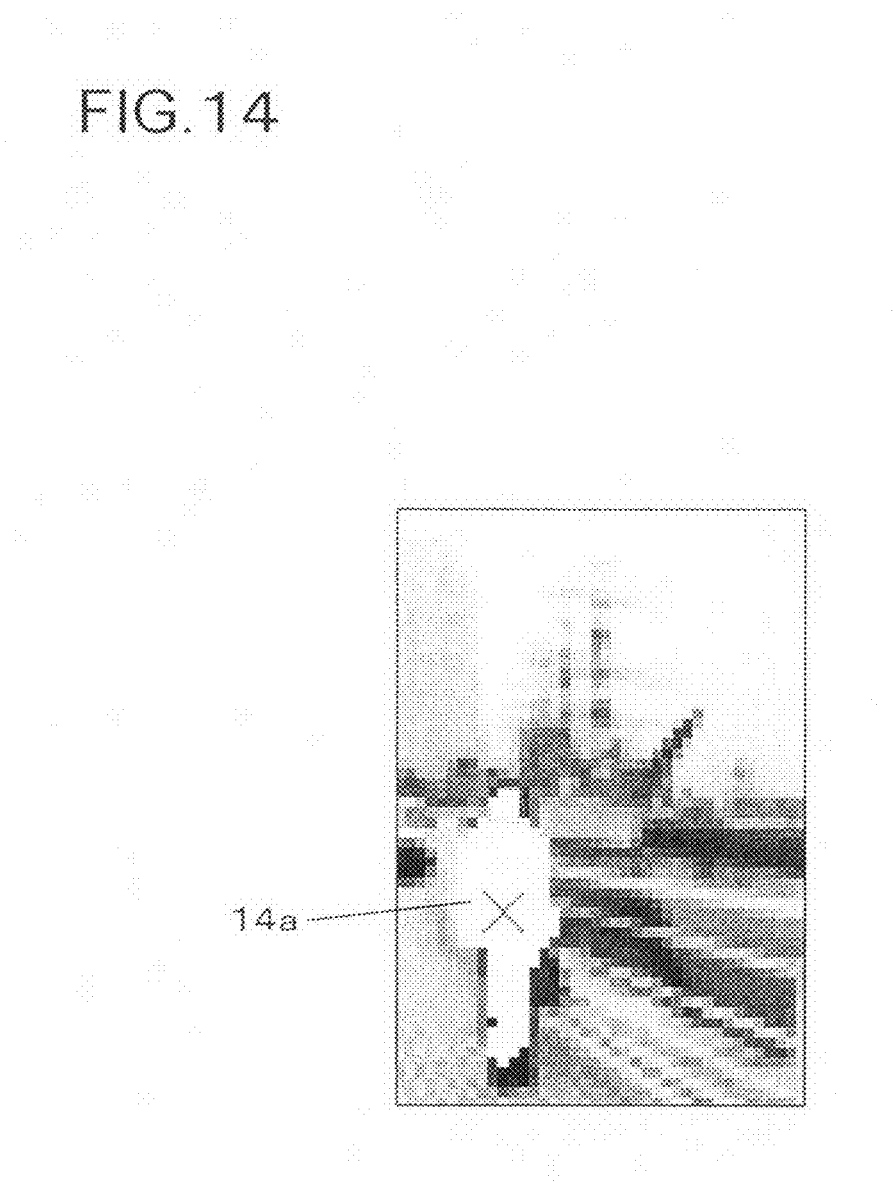
FIG. 14 is a first figure showing a concrete example of the position, size, and shape of a photographic subject within a subject image.

Then the flow of control proceeds to a step S2600, in which the control unit 104 combines the pixel islands of the binarized images 10b, 10c, and 9d that were selected in the step S2500, and thereby the shape of the photographic subject within the subject image is extracted. This combination may take, for example, the logical sum (OR) of their white pixels. By doing this, as shown in FIG. 14, the position and the shape of the photographic subject 14a within the subject image are extracted. Moreover, by doing this, the size of the photographic subject 14a within the subject image is also specified. Then the flow of control proceeds to a step S2700, in which the control unit 104 records in the memory the positions of the barycenters of the pixel islands within the subject image that were selected in the step S2500, and the number of binarized images that were employed in this combination, and then this processing terminates.

Figure 15:
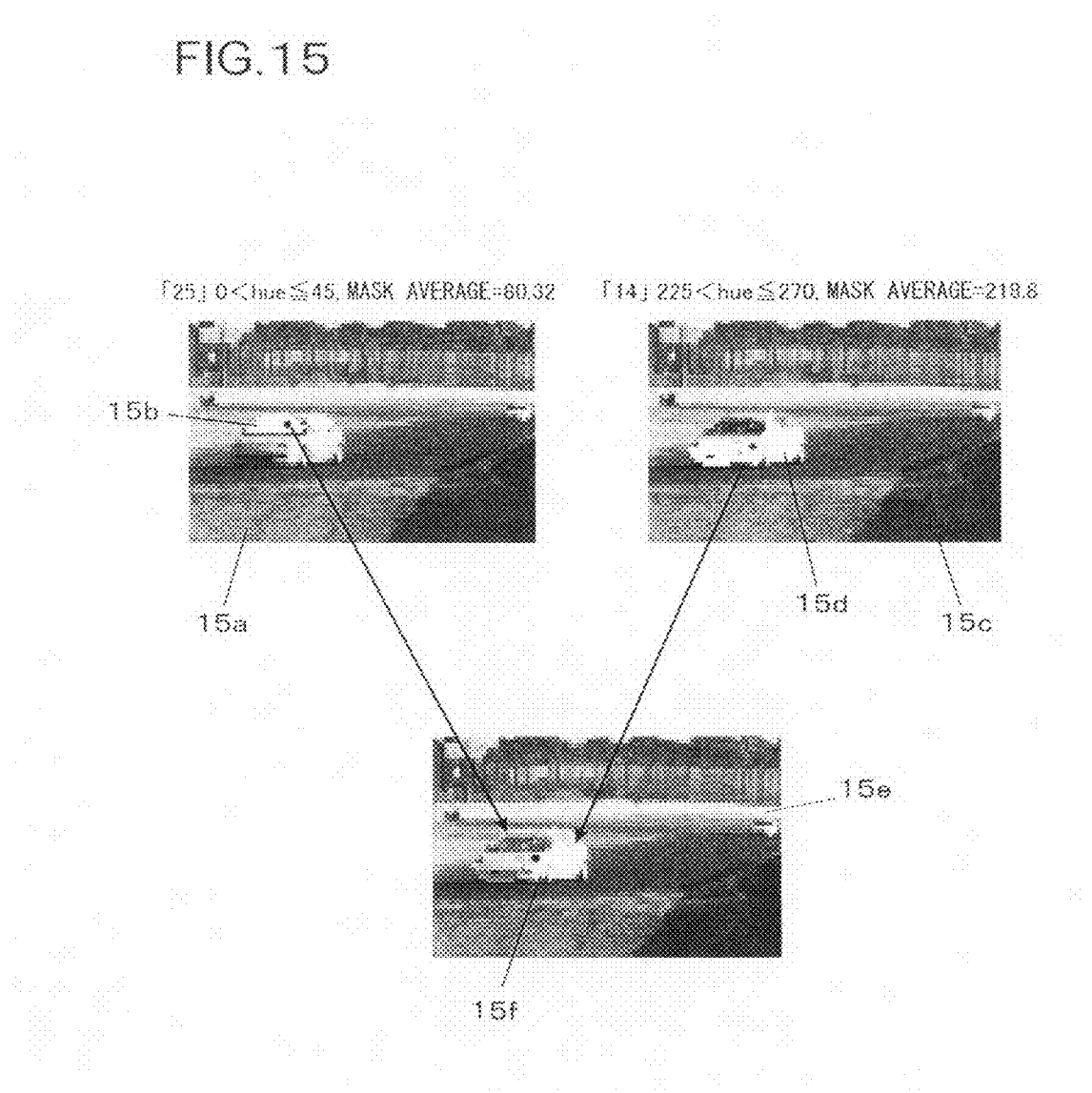
FIG. 15 is a second figure showing a concrete example of the position, size, and shape of a photographic subject within a subject image.

On the other hand, if the result of the decision in the step S2200 is negative, then the flow of control is transferred to a step S2300, in which the control unit 104 takes that first ranked pixel island (i.e. that first pixel island) extracted in the step S2000 whose main evaluation value is the greatest as being the photographic subject estimated point, and calculates the ranging value of the neighborhood of that photographic subject estimated point. Then the flow of control proceeds to a step S2400, in which, for each of the binarized images, the control unit 104 specifies a first pixel island, and also specifies, as being a second pixel island, the pixel island for which the ranging target point is closest to the ranging target point of that first pixel island and that moreover is close upon the screen thereto. And the control unit 104 specifies the position, the size, and the shape of the photographic subject within the subject image by combining the binarized image in which the first pixel island is extracted and the binarized image in which the second pixel island is extracted. For example if, as shown in FIG. 15, a first pixel island 15b is extracted from within the binarized image 15a and a second pixel island 15d is extracted from within the binarized image 15c, then the position, the size, and the shape of the photographic subject 15f can be specified on the basis of the combined image 15e that is obtained by combining the binarized image 15a and the binarized image 15c.

According to the first embodiment of the present invention as explained above, the following beneficial operational advantages are obtained.

(1) The control unit 104 classifies the subject image into ones corresponding to eight sectors (subdivisions) on the basis of hue angle, and binarizes an image in each of the sectors. Furthermore, the control unit 104 also binarizes the luminance image and the two color difference images, and further obtains a binarized Y-complement image by inverting the binarized luminance image. Moreover it is arranged for the control unit 104 to calculate evaluation values that are employed for specifying the position, the size, and the shape of the photographic subject within the subject image on the basis of these binarized images, and to specify the position, the size, and the shape of the photographic subject within the subject image on the basis of these evaluation values. Due to this, it is possible to specify the position, the size, and the shape of the photographic subject within the subject image at high accuracy.

(2) It is arranged for the evaluation values to include the main evaluation values that are calculated according to Equation (5). Due to this, it is possible to specify the position, the size, and the shape of the photographic subject at high accuracy while taking into account the areas of the pixel islands, and the overall states of the white pixels within the pixel islands.

(3) It is arranged for the evaluation values to include the secondary evaluation values #1 that are calculated according to Equation (6), the secondary evaluation values #2 that are calculated for each of the pixel islands on the basis of the aspect ratio of the enveloping rectangle that encloses that pixel island, and the secondary evaluation values #3 that are calculated on the basis of the sizes of the regions that include the face of a person. Due to this, it is possible to eliminate in advance, from the subjects for processing, those pixel islands whose shapes or sizes cannot be those of normal photographic subjects.

(4) From among the plurality of pixel islands, it is arranged for the control unit 104 to eliminate from the subjects of processing those pixels islands for which, on the basis of the secondary evaluation values #1 through #3, the possibility of being the photographic subject is low, and, from the remainder of the pixel islands, to specify as the photographic subject candidates those whose main evaluation values are large. By doing this, it is possible to specify the photographic subject candidates with high accuracy.

(5) It is arranged for the control unit 104 to set, as the inferred position of the photographic subject, either a position that has been designated by the user, or a position at which the face of a photographic subject has been detected. Due to this, it is possible to infer the position of the photographic subject by simple processing.

(6) It is arranged for the control unit 104 to infer the position of the upper half of the body of the photographic subject and the position of the lower half of his body on the basis of the position at which the face of the photographic subject has been detected. Due to this, it is possible to infer the position of the upper half of the body of the photographic subject and the position of the lower half of his body with simple processing that takes the position of the face of the photographic subject as a reference.

(7) It is arranged to specify the position, the size, and the shape of the photographic subject by combining pixel islands that correspond to the position of the upper half of the body of the photographic subject and pixel islands that correspond to the position of the lower half of his or her body. By doing this, if it is possible to detect the face of the photographic subject, then it is possible to specify the position, the size, and the shape of the photographic subject at high accuracy.

(8) It is arranged for the control unit 104 to specify the first pixel island whose main evaluation value is the largest, and also, as the second pixel island, the pixel island whose ranging target point is closest to that of the first pixel island and that moreover is in a position close thereto upon the screen, and to specify the position, the size, and the shape of the photographic subject by combining these. By doing this, it is still possible to specify the position, the size, and the shape of the photographic subject at high accuracy, even if it is not possible to detect the face of the photographic subject.

-Embodiment Two-

In the first embodiment described above, an example was explained in which the hue in the color information for the image was used as the information for specifying the position, the size, and the shape of the photographic subject. By contrast, in this second embodiment, an example is explained in which the control unit 104 uses the luminance, the color difference (chrominance) and the color difference (chrominance) space in the color information for the image, as the information for specifying the position, the size, and the shape of the photographic subject.

Figure 17:
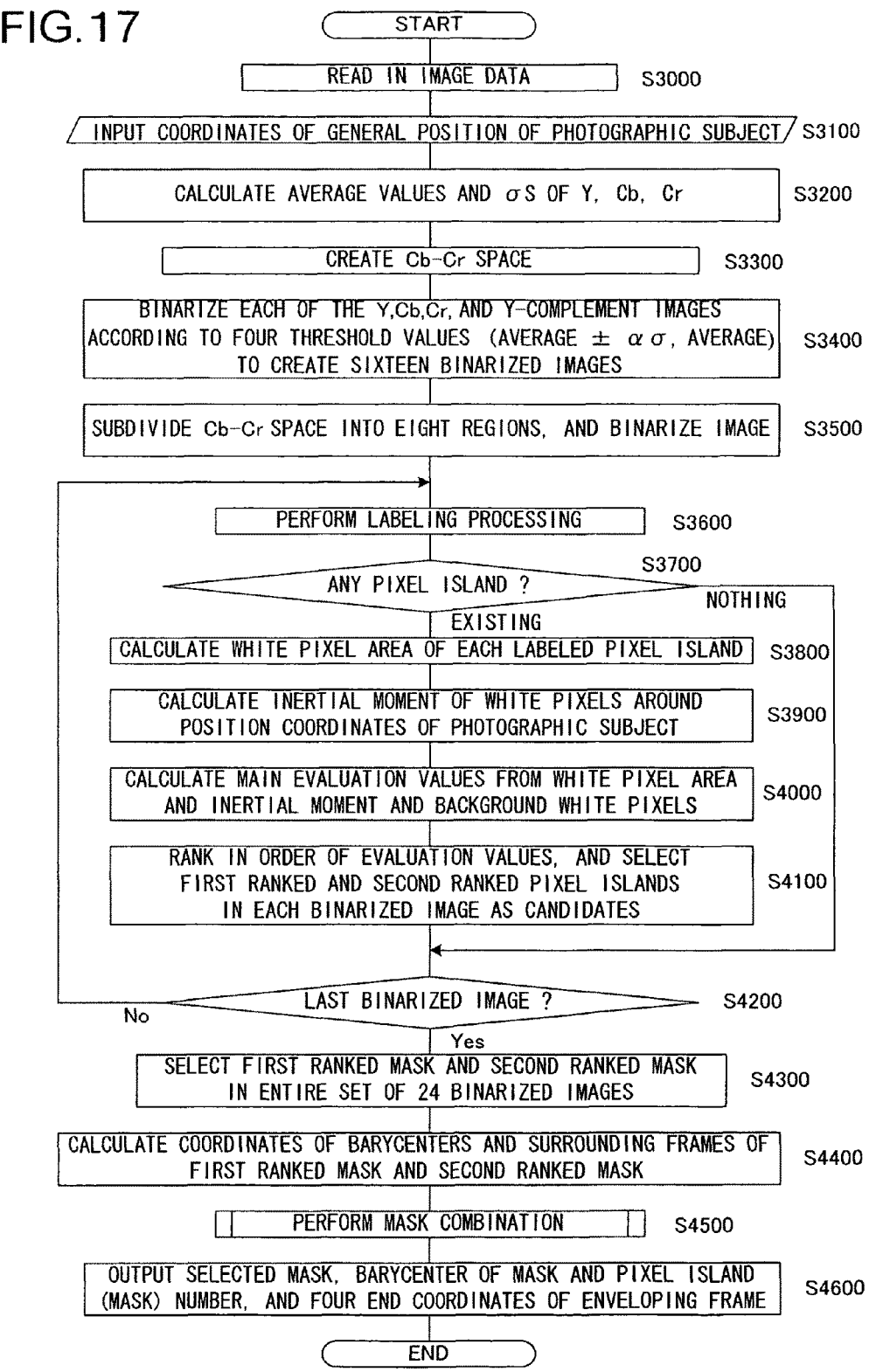
FIG. 17 is a flow chart showing a flow of processing for photographic subject extraction in a second embodiment.

FIG. 17 is a figure showing a flow of processing in a second embodiment for extraction of a photographic subject that is a subject for focus adjustment. The processing shown in FIG. 17 is executed by the control unit 104 as a program that starts when input of image data from the imaging sensor 103 is started. In a first step S3000, the control unit 104 reads in the image data inputted from the imaging sensor 103, and then the flow of control proceeds to a step S3100. In this step S3100, input is received from the user of the general position of the photographic subject within the image data that has been read in the step S3000. It is possible to extract the photographic subject accurately, if the input of the position of the photographic subject is received from the user. However, if the accuracy by which extraction of the photographic subject can be performed is not considered, the control unit 104 could set some specified position within the image, such as for example the position of the center of the image, as the position of the photographic subject without receiving the designation of the photographic subject from the user.

Then the flow of control proceeds to a step S3200, in which, in a similar manner to the first embodiment, the control unit 104 converts the subject image to an image in the YCbCr format, an creates each of a Y plane image, a Cr plane image, a Cb plane image, and a Y-complement plane image. And, for each of the Y plane image, the Cr plane image, the Cb plane image, and the Y-complement plane image, the control unit 104 calculates the average value Ave of its pixel values and their standard deviation σ. Then the flow of control proceeds to a step S3300, in which the control unit 104 creates a two dimensional color difference space (a Cb—Cr space) having the Cb value along the vertical axis and the Cr value along the horizontal axis, and then the flow of control proceeds to a step S3400.

Figure 18:
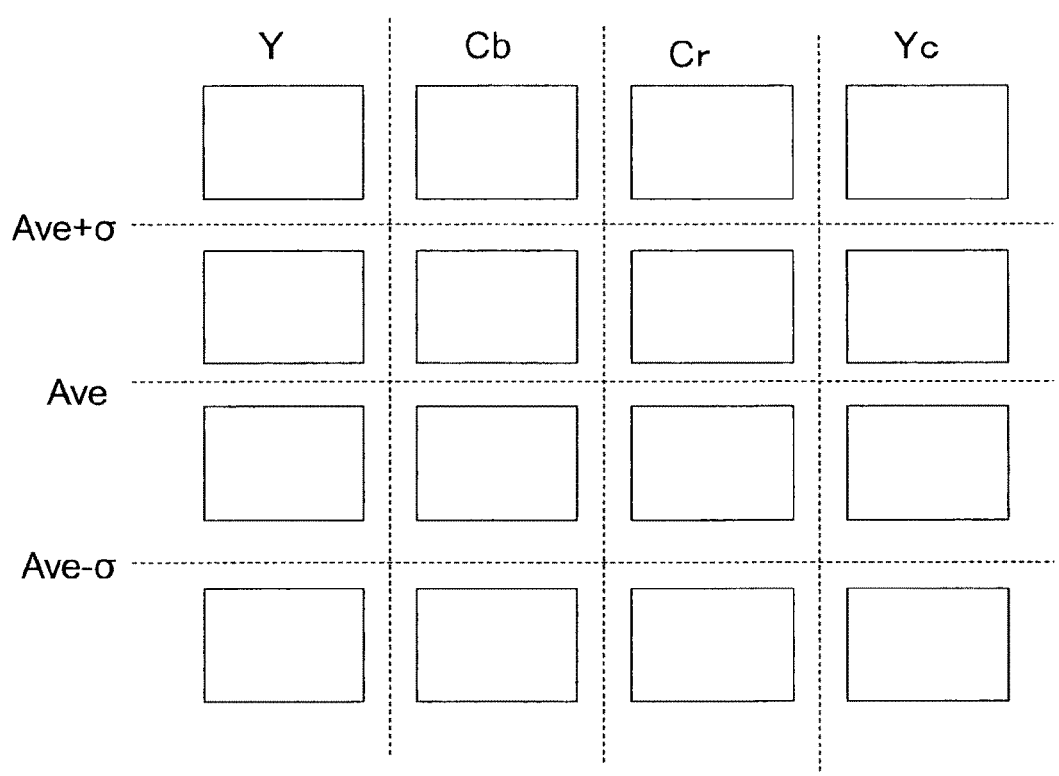
FIG. 18 is a figure schematically showing a method for binarizing a Y plane image, a Cr plane image, a Cb plane image, and a Y-complement plane image.

In this step S3400, the control unit 104 binarizes each of the Y plane image, the Cr plane image, the Cb plane image, and the Y-complement plane image using as threshold values the average value Ave of its pixels, and the standard deviation σ, as shown in FIG. 18. Due to this, on the basis of the subject image shown in FIG. 19, four binarized images are created for each of the Y plane image, the Cr plane image, the Cb plane image, and the Y-complement plane image; i.e., in total, 16 binarized images are created, as shown in FIG. 20.

Figure 21:
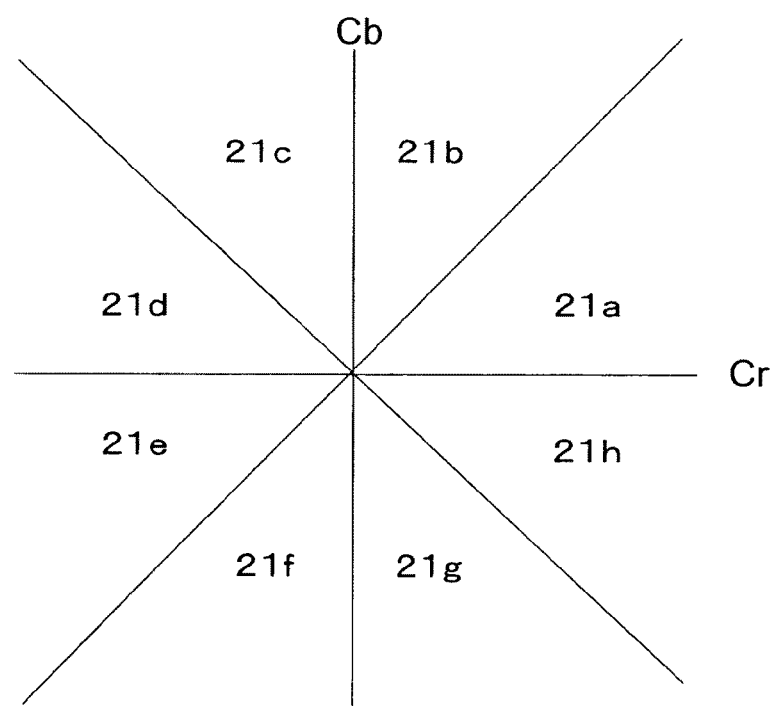
FIG. 21 is a figure schematically showing an example in which a color difference space is subdivided into eight sectors.

Then the flow of control proceeds to a step S3500 in which, using the image data that has been converted to the YCbCr format, the control unit 104 binarizes the subject image in eight ways, according to eight sectors in the color difference space that was created in the step S3300. In concrete terms, as shown in FIG. 21, the control unit 104 subdivides the two dimensional color difference space (a Cb—Cr space) having the Cb value along the vertical axis and the Cr value along the horizontal axis at equal angular intervals into the eight sectors (subdivisions) 21*a* through 21*h*. And then, as an initial step, the control unit 104 creates eight images each having the same size as the subject image, corresponding to each of these sectors 21*a* through 21*h*, and sets all of the pixel values in each of these eight binary images to 0.

Then, using the pixel values of the corresponding pixels of the Cb plane image and the Cr plane image, the control unit 104 binarizes the subject image into the binary images corresponding eight sectors 21*a* through 21*h*, using the following Equations (7) through (14). In other words, the control unit 104 binarizes the subject image into each of the binary images in each of the sectors 21*a* through 21*h* on the basis of the magnitude relationships of the Cb values and the Cr values, the sign of the Cb values and the sign of the Cr values in the subject image, as follows:

$$Cb \geq 0, Cr \geq 0, \text{ and } |Cr| \geq |Cb| \rightarrow \text{sector } 21a \quad (7)$$

$$Cb \geq 0, Cr \geq 0, \text{ and } |Cr| < |Cb| \rightarrow \text{sector } 21b \quad (8)$$

$$Cb \geq 0, Cr < 0, \text{ and } |Cr| \leq |Cb| \rightarrow \text{sector } 21c \quad (9)$$

$$Cb \geq 0, Cr < 0, \text{ and } |Cr| > |Cb| \rightarrow \text{sector } 21d \quad (10)$$

$$Cb < 0, Cr < 0, \text{ and } |Cr| > |Cb| \rightarrow \text{sector } 21e \quad (11)$$

$$Cb < 0, Cr < 0, \text{ and } |Cr| \leq |Cb| \rightarrow \text{sector } 21f \quad (12)$$

$$Cb < 0, Cr \geq 0, \text{ and } |Cr| < |Cb| \rightarrow \text{sector } 21g \quad (13)$$

$$Cb < 0, Cr \geq 0, \text{ and } |Cr| \geq |Cb| \rightarrow \text{sector } 21h \quad (14)$$

In concrete terms, if the pixel values of the corresponding pixels in the Cb plane image and in the Cr plane image satisfy Equation (7), then the control unit 104 changes the pixel value of the corresponding pixel in the binary image of sector 21*a* to 1. Moreover, if the pixel values of the corresponding pixels in the Cb plane image and in the Cr plane image satisfy Equation (8), then the control unit 104 changes the pixel value of the corresponding pixel in the binary image of sector 21*b* to 1. In a similar manner, if the pixel values of the corresponding pixels in the Cb plane image and in the Cr plane image satisfy Equation (9), then the control unit 104 changes the pixel value of the corresponding pixel in the binary image of sector 21*c* to 1. And, if the pixel values of the corresponding pixels in the Cb plane image and in the Cr plane image satisfy Equation (10), then the control unit 104 changes the pixel value of the corresponding pixel in the binary image of sector 21*d* to 1.

Furthermore, if the pixel values of the corresponding pixels in the Cb plane image and in the Cr plane image satisfy Equation (11), then the control unit 104 changes the pixel value of the corresponding pixel in the binary image of sector 21*e* to 1; and, if the pixel values of the corresponding pixels in the Cb plane image and in the Cr plane image satisfy Equation (12), then the control unit 104 changes the pixel value of the corresponding pixel in the binary image of sector 21*f* to 1. Moreover, if the pixel values of the corresponding pixels in the Cb plane image and in the Cr plane image satisfy Equation (13), then the control unit 104 changes the pixel value of the corresponding pixel in the binary image of sector 21*g* to 1; and, if the pixel values of the corresponding pixels in the Cb plane image and in the Cr plane image satisfy Equation (14), then the control unit 104 changes the pixel value of the corresponding pixel in the binary image of sector 21*h* to 1.

Figure 22:
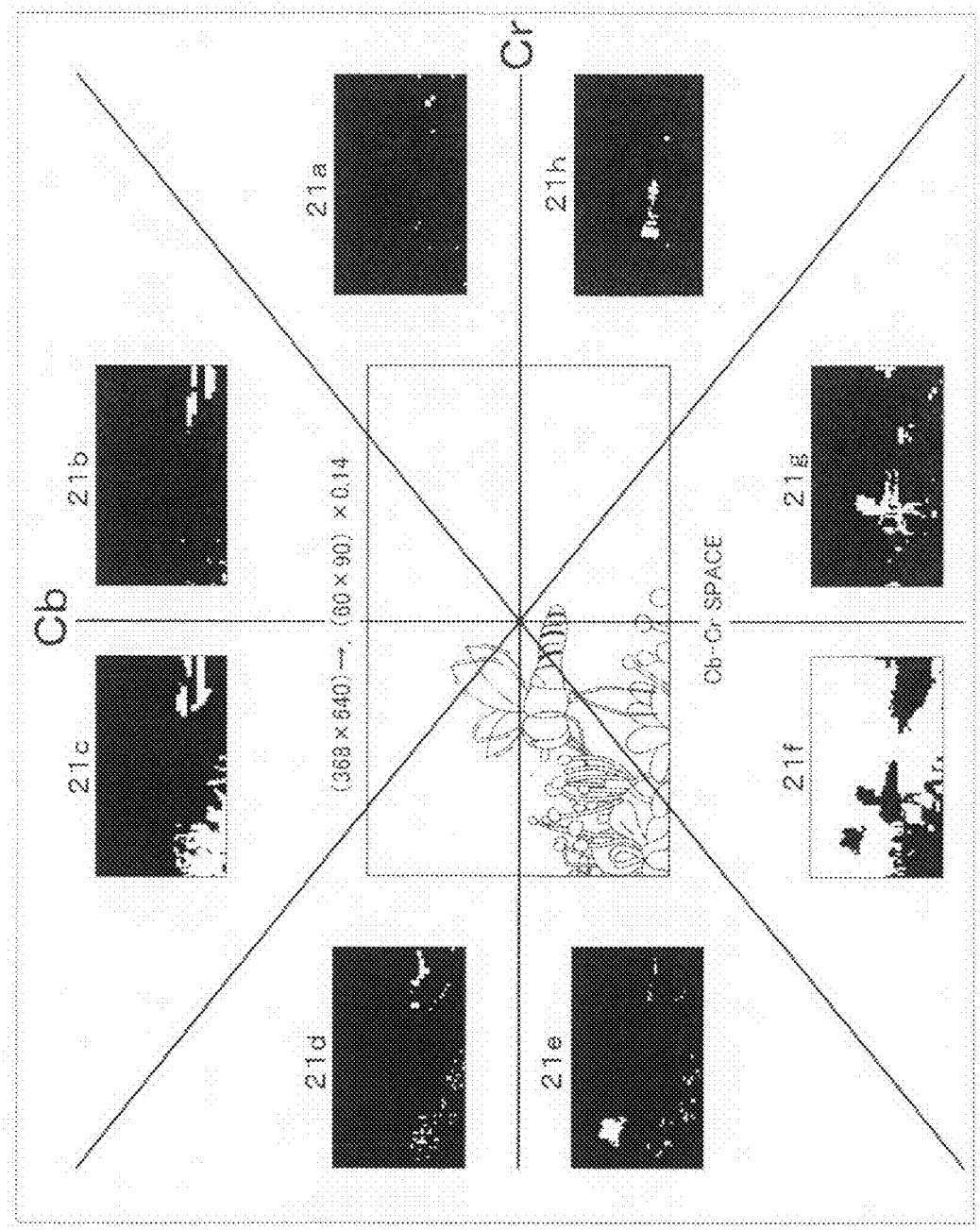
FIG. 22 is a figure showing an example of binarization in this color difference space.

By performing the decision described above for all of the corresponding pixels in the Cb plane image and in the Cr plane image by using Equations (7) through (14) described above, the control unit 104 creates eight binarized images on the basis of the eight sector images. Due to this, the binarized images of eight sectors shown in FIG. 22 are created on the basis of the subject image shown in FIG. 19.

Then the flow of control proceeds to a step S3600. The processing from the step S360 to the step S4100 is executed for each of the total of 24 binarized images, consisting of the binarized images corresponding sixteen subdivisions shown in FIG. 20 and the binarized images corresponding eight subdivisions shown in FIG. 22. In this step S3600, the control unit 104 takes as subject a single binarized image that has been selected from among the total of 24 binarized images consisting of the 16 binarized images shown in FIG. 20 and the eight binarized images shown in FIG. 22, and performs labeling processing upon that single binarized image by recognizing the state in which the pixels in that binarized image are linked together. For this labeling processing, a per se known method may be used. For example, as labeling regions, the control unit 104 may extract aggregated sets of white pixels and aggregated sets of black pixels within the binarized image, may detect labeling regions consisting of white pixels among these labeling regions that have been extracted as being pixel islands, and may perform labeling by attaching labels to these pixel islands.

Then the flow of control proceeds to a step S3700, in which the control unit 104 makes a decision as to whether or not there is any pixel island (i.e. a clump of white pixels) to which a label has been attached. If a negative decision is reached in this step S3700, then the flow of control is transferred to a step S4200 that will be described hereinafter. But if an affirmative decision is reached in this step S3700, then the flow of control proceeds to a step S3800. In this step S3800, the control unit 104 calculates the white pixel area of each pixel island that has been labeled. Then the flow of control proceeds to a step S3900, in which the control unit 104 takes as subject the white pixels of each pixel island that has been labeled, and calculates their inertial moment (the inertial moment of the white pixels around the barycenter) around the position of the photographic subject that was designated by the user in the step S3100 as a center. It should be understood that detailed explanation of the method of calculating the inertial moment of the white pixels in the binarized image around the barycenter is omitted because it is per se known; for example, it would be possible to calculate this inertial moment by summing the squares of the pixel distances from the inferred position point of the photographic subject multiplied by (0 or 1). Then the flow of control proceeds to a step S4000.

In this step S4000, the control unit 104 calculates a main evaluation value according to the following Equation (15), on the basis of the inertial moment of the white pixels around the barycenter that has been calculated in the step S3900.

main evaluation value=number of white pixels making up the pixel island/inertial moment of these white pixels around the barycenter as a center (15)

Then the flow of control proceeds to a step S4100, in which the control unit 104 extracts a first ranked pixel island for which the main evaluation value calculated in the step S400 is largest, and a second ranked pixel island for which it is second largest, as photographic subject candidates for this binarized image, and then the flow of control proceeds to a step S4200. In this step S4200, the control unit 104 decides whether or not the processing from the step S3600 through the step S4100 has been completed for all of the total of 24 binarized images, i.e. the 16 binarized images shown in FIG. 20 and the eight binarized images shown in FIG. 22. If a negative decision is reached in this step S4200, then the flow of control returns to the step S3600, one of the binarized images among those binarized images for which the processing has not yet been performed is selected, and the processing from the step S3600 through the step S4100 is executed again. But if an affirmative decision is reached in this step S4200, then the flow of control proceeds to a step S4300.

In this step S4300, the control unit 104 compares together the main evaluation values for the first ranked pixel islands and the second ranked pixel islands that have been extracted from each of the 24 binarized images, in other words compares together the main evaluation values of a total of 48 pixel islands, and extracts the first ranked pixel island and the second ranked pixel island in the entire total of 24 binarized images. In order to distinguish this first ranked pixel island and this second ranked pixel island for the entire set of 24 binarized images that are extracted in this step S4300 from the first ranked pixel islands and the second ranked pixel islands that were extracted from each of the binarized images in the earlier step S4100, they will be termed the "first ranked mask" and the "second ranked mask". Then the flow of control proceeds to a step S4400, in which the control unit 104 calculates the coordinates of the barycenter of each of the first ranked pixel island and the second ranked pixel island among the entire set thereof, and the coordinates of enveloping frames for each of those pixel islands, and then the flow of control proceeds to a step S4500.

Figure 23:
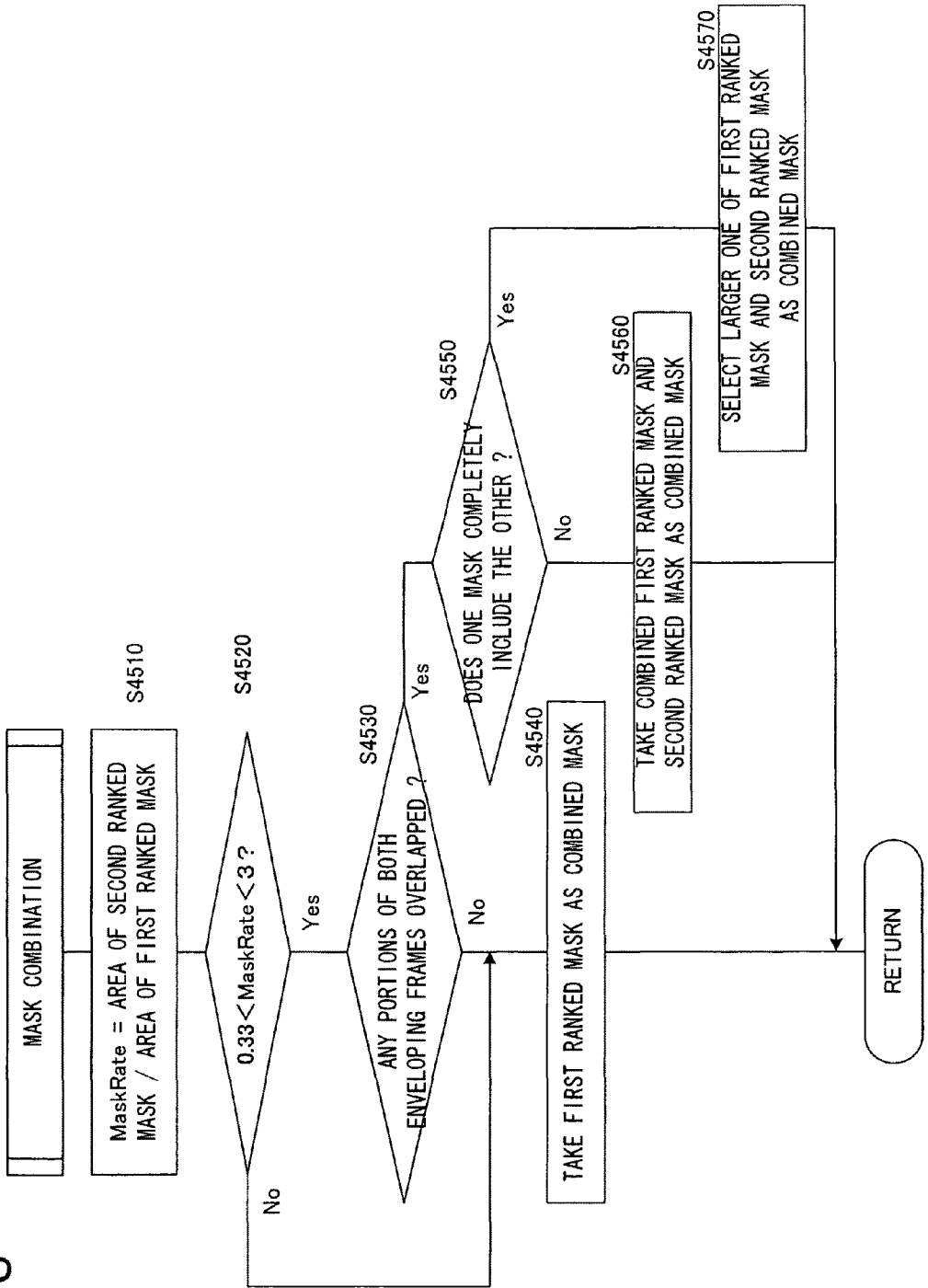
FIG. 23 is a flow chart showing a flow of processing for mask combination, in this second embodiment.

In the step S4500, the control unit performs mask combination processing shown in FIG. 23. Now, this mask combination processing will be explained. In a step S4510, the control unit calculates a "Mask Rate" according to the following Equation (16):

Mask Rate=area of second ranked mask/area of first ranked mask    (16)

Then the flow of control proceeds to a step S4520, in which the control unit 104 makes a decision as to whether or not Mask Rate is within a predetermined range, for example between 0.33 and 3. If a negative decision is reached in this step S4520, then the flow of control is transferred to a step S4540 that will be described hereinafter. But if an affirmative decision is reached in this step S4520, then the flow of control proceeds to a step S4530. The reason that, in this manner, the processing of the step S4530 is only executed if Mask Rate is within the predetermined range, is in order to prevent combination of a first ranked mask and a second ranked mask whose sizes are too different.

In the step S4530, the control unit 104 makes a decision as to whether or not there is any overlapping portion between the enveloping frame that envelopes the first ranked mask and the enveloping frame that envelopes the second ranked mask. If a negative decision is reached in this step S4530, then the flow of control proceeds to the step S4540. And, in this step S4540, the control unit 104 selects the first ranked mask as being the combined mask, and then the flow of control returns to the processing shown in FIG. 17.

Figure 24A:
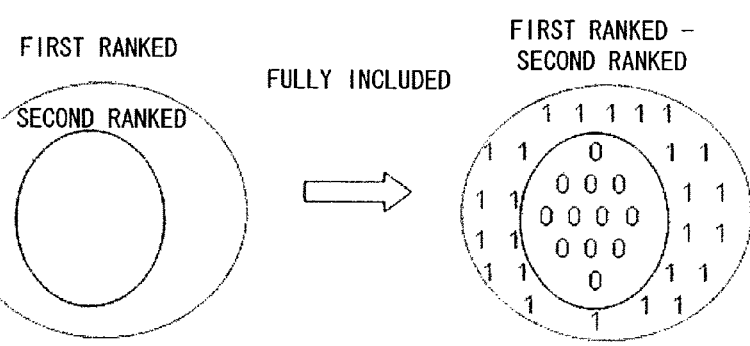
FIGS. 24A and 24B are figures showing concrete examples of states of inclusion between two masks.

By contrast, if an affirmative decision is reached in the step S4520, then the flow of control is transferred to a step S4550. In this step S4550, the control unit 104 makes a decision as to whether or not one of the first ranked mask and the second ranked mask is included in the other. For example if, as shown in FIG. 24A, the result of subtracting the second ranked mask from the first ranked mask includes no pixels of value −1, then the control unit 104 may decide that the first ranked mask fully includes the second ranked mask. On the other hand, the control unit 104 may decide that the second ranked mask fully includes the first ranked mask, if the result of subtracting the second ranked mask from the first ranked mask includes no pixels of value +1.

Figure 24B:
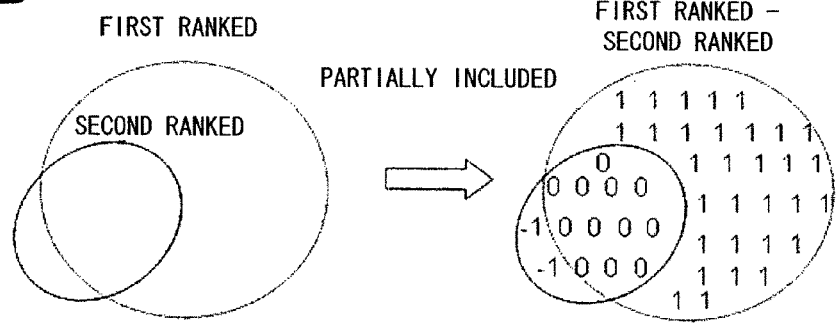

Moreover if, as shown in FIG. 24B, the result of subtracting the second ranked mask from the first ranked mask includes both at least one pixel of value of +1 and at least one pixel of value −1, then the control unit 104 calculates the numerical value obtained by dividing the number of pixels of value +1 by the number of pixels in the first ranked mask (hereinafter termed the "numerical value #1"), and the numerical value obtained by dividing the number of pixels of value −1 by the number of pixels in the second ranked mask (hereinafter termed the "numerical value #2"). And, if the numerical value #1 is greater than or equal to the numerical value #2, and moreover the numerical value #2 is smaller than some predetermined value, for example 0.05, then the control unit 104 decides that the first ranked mask partially includes the second ranked mask. On the other hand, if the numerical value #2 is greater than or equal to the numerical value #1, and moreover the numerical value #1 is smaller than the predetermined value, for example 0.05, then the control unit 104 decides that the second ranked mask partially includes the first ranked mask. By doing this, if either one of the masks includes 95% or more of the other, then this is taken as being inclusion (full inclusion or partial inclusion).

Figure 25A:
FIGS. 25A and 25B are figures showing an example of extraction of a first ranked mask and a second ranked mask in the second embodiment.
Figure 25B:
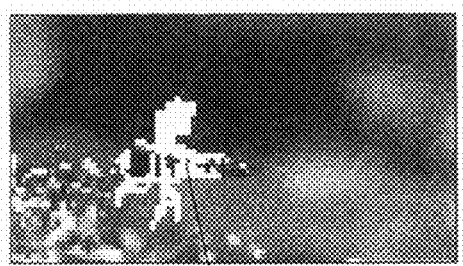
Figure 26:
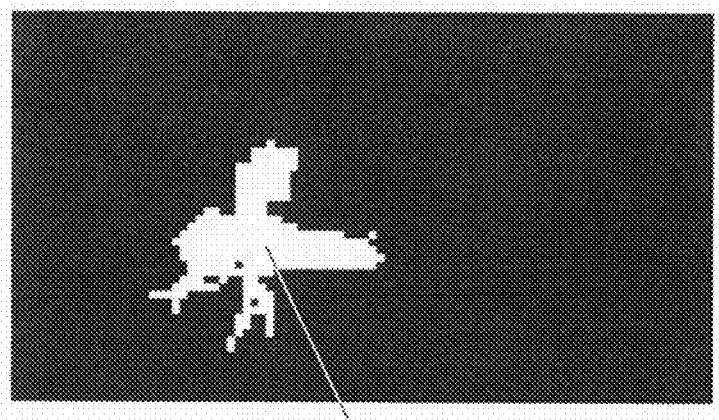
FIG. 26 is a figure showing a concrete example of a combined mask that has been selected by combining the first ranked mask and the second ranked mask, in this second embodiment.

If an affirmative decision is reached in the step S4550, then the flow of control is transferred to a step S4570, in which the control unit 104 selects the larger one among the first ranked mask and the second ranked mask as being the combined mask, and then the flow of control returns to the processing of FIG. 17. But if a negative decision is reached in the step S4550, then the flow of control proceeds to a step S4560, in which the control unit 104 combines the first ranked mask and the second ranked mask by taking their logical sum (OR) and selects the result as the combined mask, and then the flow of control returns to the processing shown in FIG. 17. For example, if the first ranked mask is the mask 25a shown in FIG. 25A and the second ranked mask is the mask 25b shown in FIG. 25B, then these two masks are combined by logical addition (OR), and the result, i.e. the mask 26a shown in FIG. 26, is selected as being the combined mask. By doing this, it is possible to extract the combined mask 26a that gives the shape of the photographic subject within the subject image shown in FIG. 19, and, on the basis of this combined mask 26a, it is possible to specify the position, the size, and the shape of the photographic subject within the subject image.

In the step S4600 of the FIG. 17 flow chart, as information related to the mask that has been selected as the combined mask, the control unit 104 outputs the barycenter of the mask that has been selected as the combined mask, the mask number of the combined mask (in other words, the label number that was assigned during the labeling processing), and the coordinate values of the four end points of the enveloping frame that envelopes the combined mask, and then the processing of this flow chart terminates.

According to the second embodiment as explained above, it is arranged for the control unit 104 to binarize the subject image using the luminance, the color differences, and the color difference space in the color information of the image, to calculate evaluation values that are used for specifying the position, the size, and the shape of the photographic subject within the subject image on the basis of these binarized images, and to specify the position, the size, and the shape of the photographic subject within the subject image on the basis of these evaluation values. Due to this, it is possible to specify the position, the size, and the shape of the photographic subject within the subject image with yet further accuracy.

-Embodiment Three-

In the second embodiment of the present invention described above an example was explained in which a combined mask was extracted by performing the described processing while taking as subjects a total of 24 binarized images, consisting of the sixteen binarized images shown in FIG. 20 and the eight binarized images shown in FIG. 22, and thereby the position, the size, and the shape of the photographic subject were specified within the subject image. In this case, since the noise in numbers 4 through 12 and 16 of the binarized images shown in FIG. 20 is high, accordingly it is considered that the possibility is low that a mask will emerge from analysis of these noisy binarized images that can be used for extraction of the photographic subject. Due to this, there is a high probability that after processing has been performed upon these ones of the binarized images it will turn out to have been useless, and this is undesirable.

Figure 27:
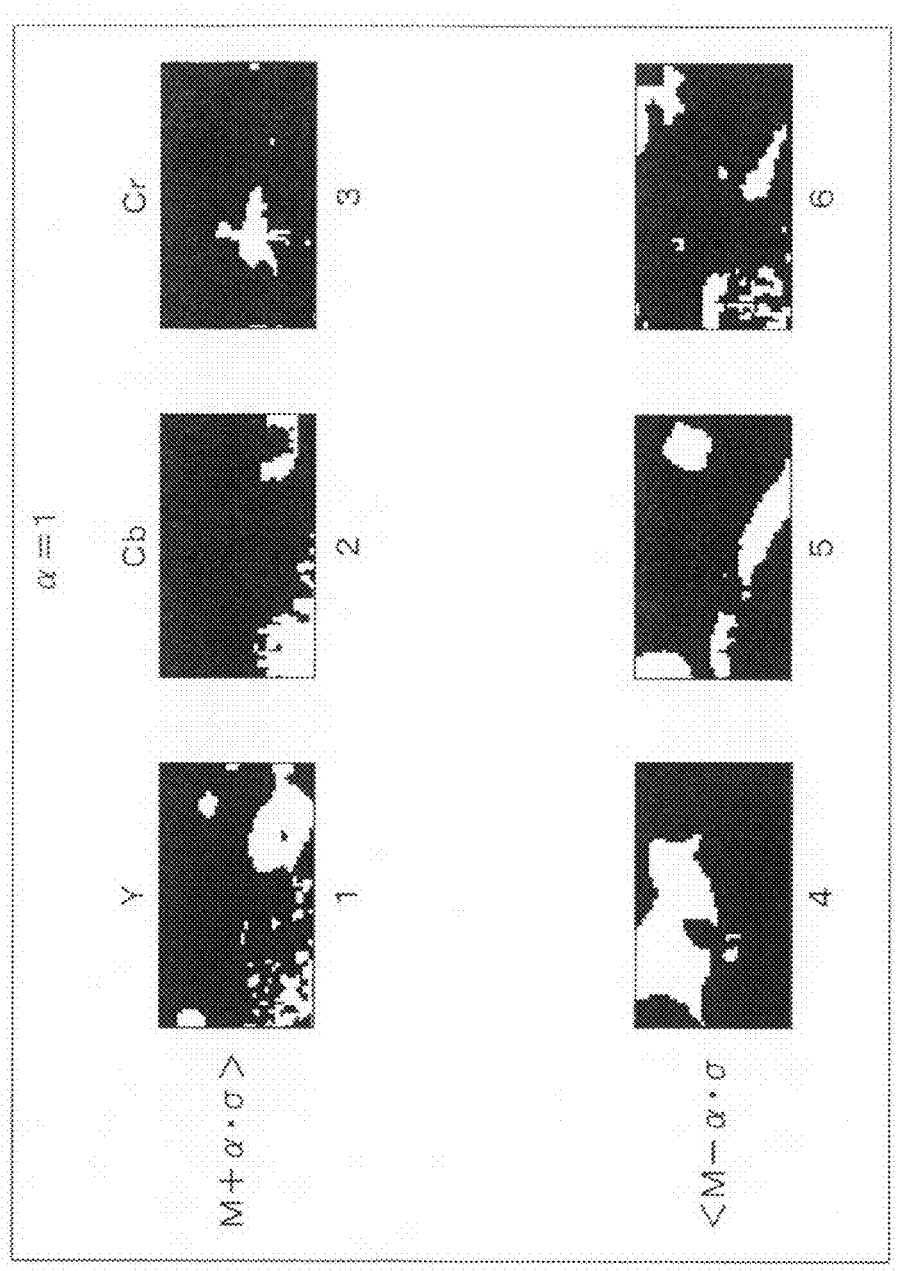
FIG. 27 is a figure showing a concrete example of six binarized images that are used in processing according to a third embodiment.

Thus, in this third embodiment, among the 16 binarized images shown in FIG. 20, processing is performed to take a total of 14 binarized images as subjects: the eight binarized images shown in FIG. 22; and the six binarized images shown in FIG. 27, in other words the three binarized images that were binarized from the Y plane image, the Cr plane image, and the Cb plane image so that their pixels whose pixel values were greater than or equal to their average value Ave+their standard deviation σ became white pixels, and the three binarized images that were binarized from the Y plane image, the Cr plane image, and the Cb plane image so that their pixels whose pixel values were less than or equal to their average value Ave−their standard deviation σ became white pixels.

Figure 19:
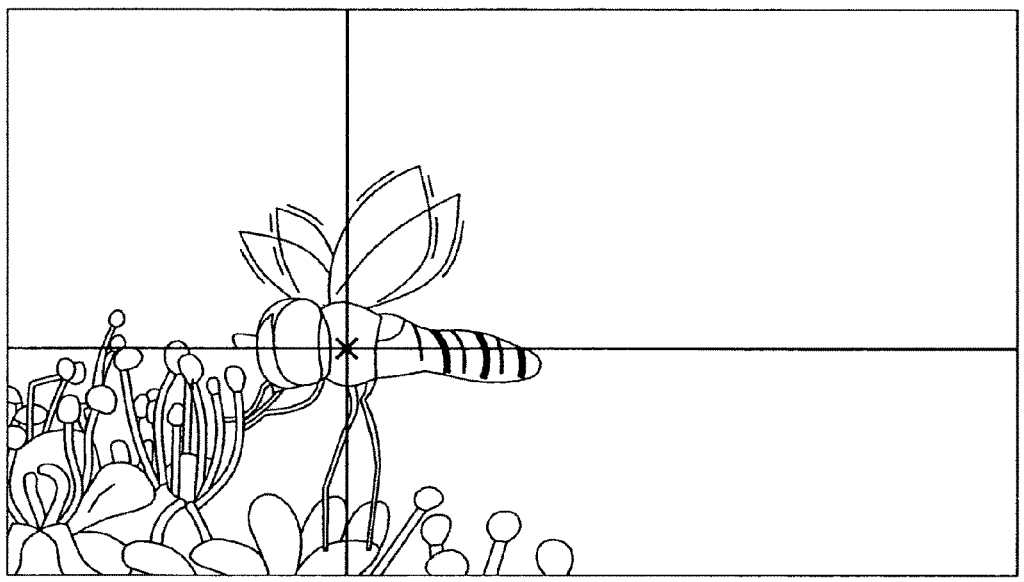
FIG. 19 is a figure showing a concrete example of an image of a photographic subject, in the second embodiment.
Figure 20:
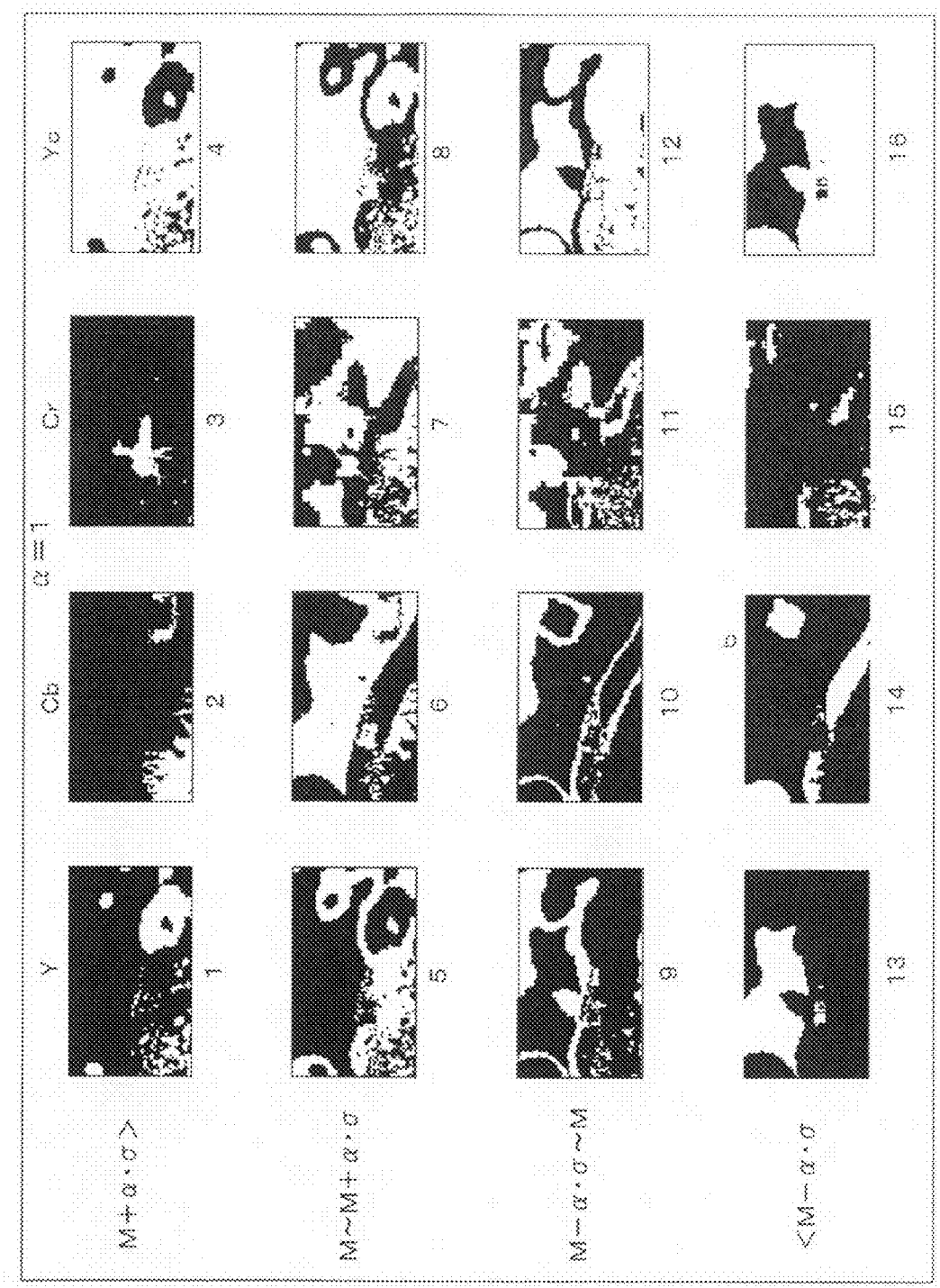
FIG. 20 is a figure showing an example of binarization of a Y plane image, a Cr plane image, a Cb plane image, and a Y-complement plane image.
Figure 28:
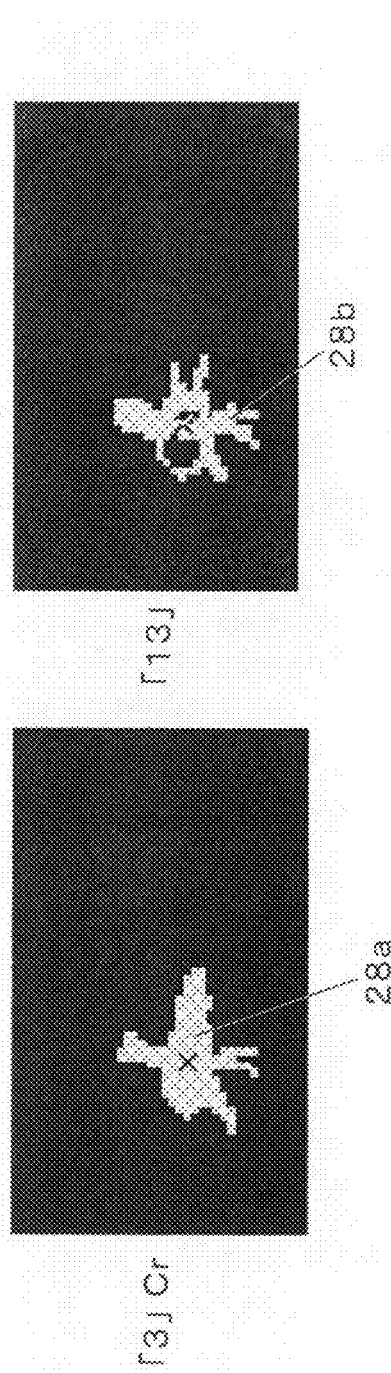
FIGS. 28A and 28B are figures showing an example of extraction of a first ranked mask and a second ranked mask in this third embodiment.
Figure 29:
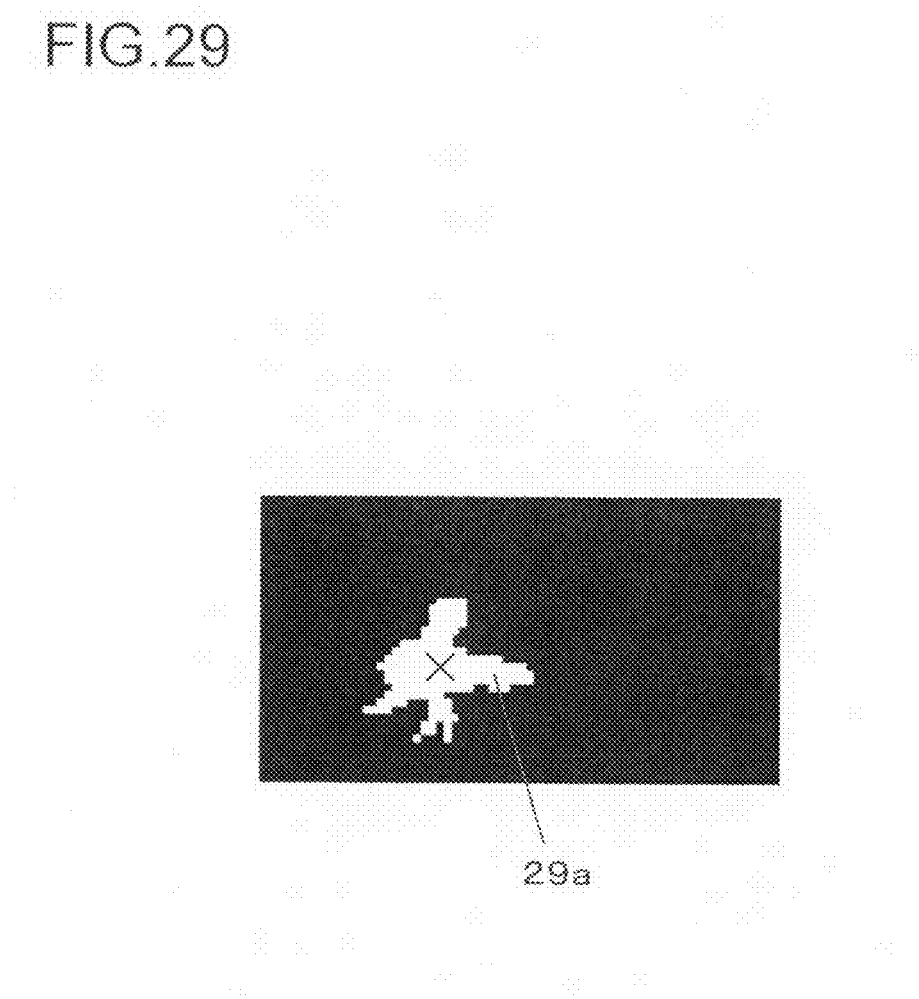
FIG. 29 is a figure showing a concrete example of a combined mask that has been selected by combining the first ranked mask and the second ranked mask, in this third embodiment.

By doing this, in this third embodiment, the first ranked mask 28a shown in FIG. 28A and the second ranked mask 18b shown in FIG. 28B are extracted on the basis of the subject image shown in FIG. 19, and the mask 29a shown in FIG. 29 resulting from these two being logically added (ORed) is selected as the combined mask. Due to this, it is possible to extract the combined mask 29a giving the shape of the photographic subject within the subject image shown in FIG. 19, and it is possible to specify the position, the size, and the shape of the photographic subject on the basis of this combined mask 29a. While, with the processing according to this third embodiment, it is possible to obtain similar results to those obtained with the second embodiment, since it is possible to reduce the number of binarized images that are employed for the processing to fewer than in the case of the second embodiment, accordingly it is possible to increase the speed of the processing.

-Embodiment Four-

Figure 30:
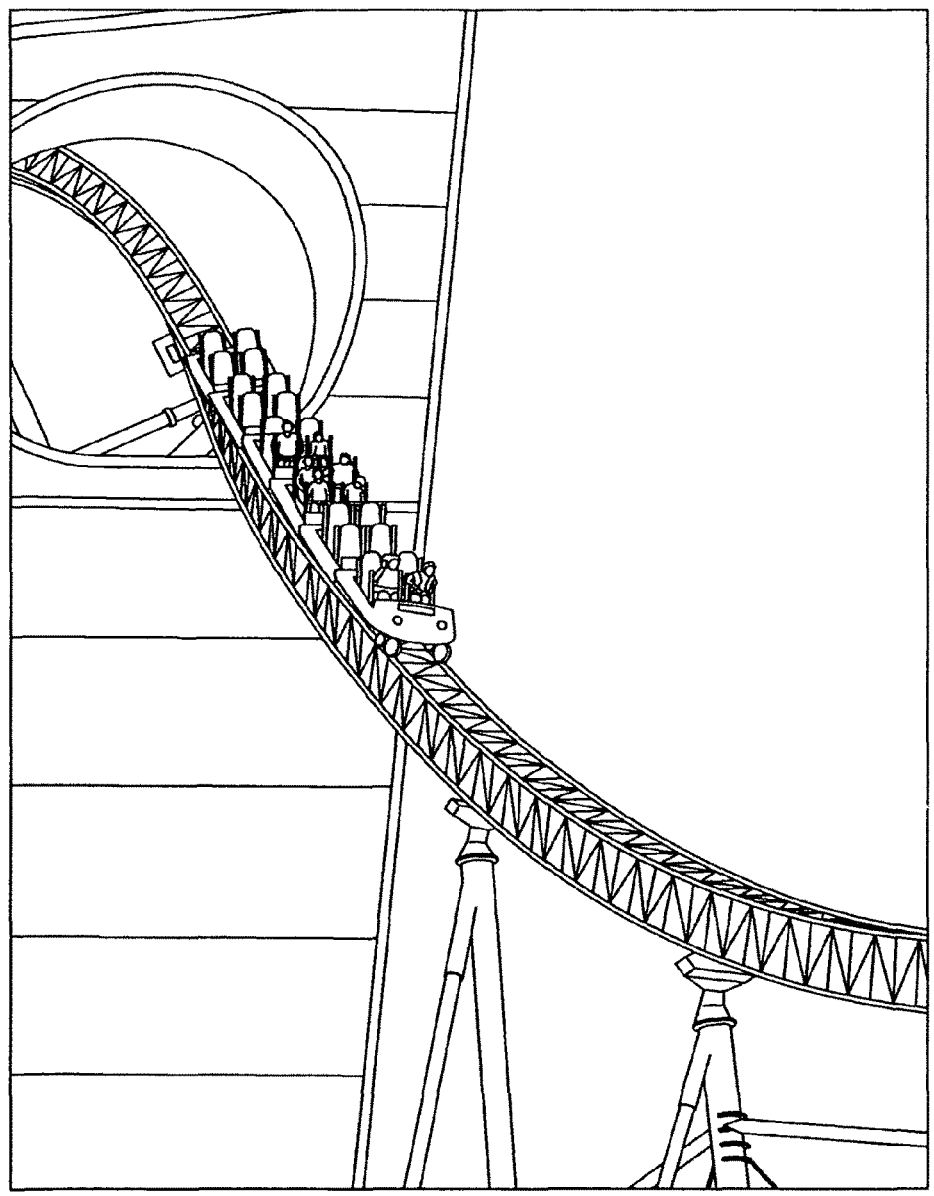
FIG. 30 is a figure showing a concrete example of an image of a photographic subject, in a fourth embodiment.
Figure 31:
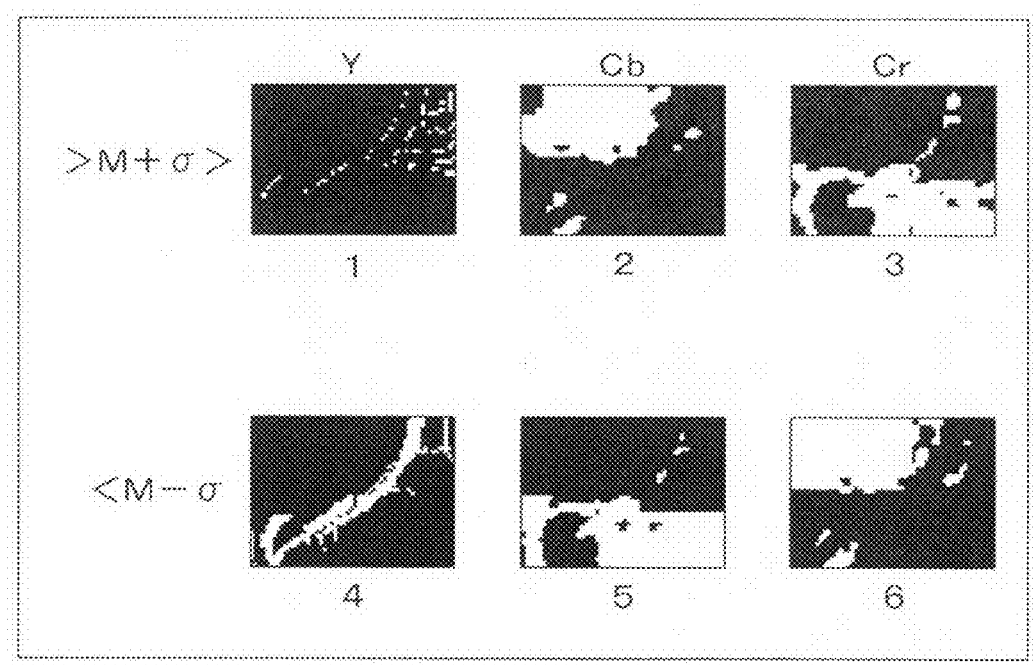
FIG. 31 is a figure showing a concrete example of six binarized images that are used in processing according to this fourth embodiment.

Furthermore, it would also be acceptable to arrange to perform the processing using only the six binarized images shown in FIG. 27. For example, it would be possible for the control unit 104 to create the six binarized images shown in FIG. 31 on the basis of the subject image shown in FIG. 30, and to specify the position, the size, and the shape of the photographic subject within the subject image, in other words the position, the size, and the shape of the jet coaster, on the basis of these binarized images. Since, with this method, it is possible yet further to reduce the number of binarized images that are used in the processing, accordingly it becomes possible to increase the processing speed yet further.

-Embodiment Five-

In the method of the fourth embodiment in which the six binarized images described above are employed, sometimes it is difficult to specify the position, the size, and the shape of the photographic subject accurately when the background and the photographic subject are similar in color. In this type of case it will be effective, as shown in FIG. 32, to add three more binarized images to the analysis procedure, thus employing a total of nine binarized images.

Figure 32:
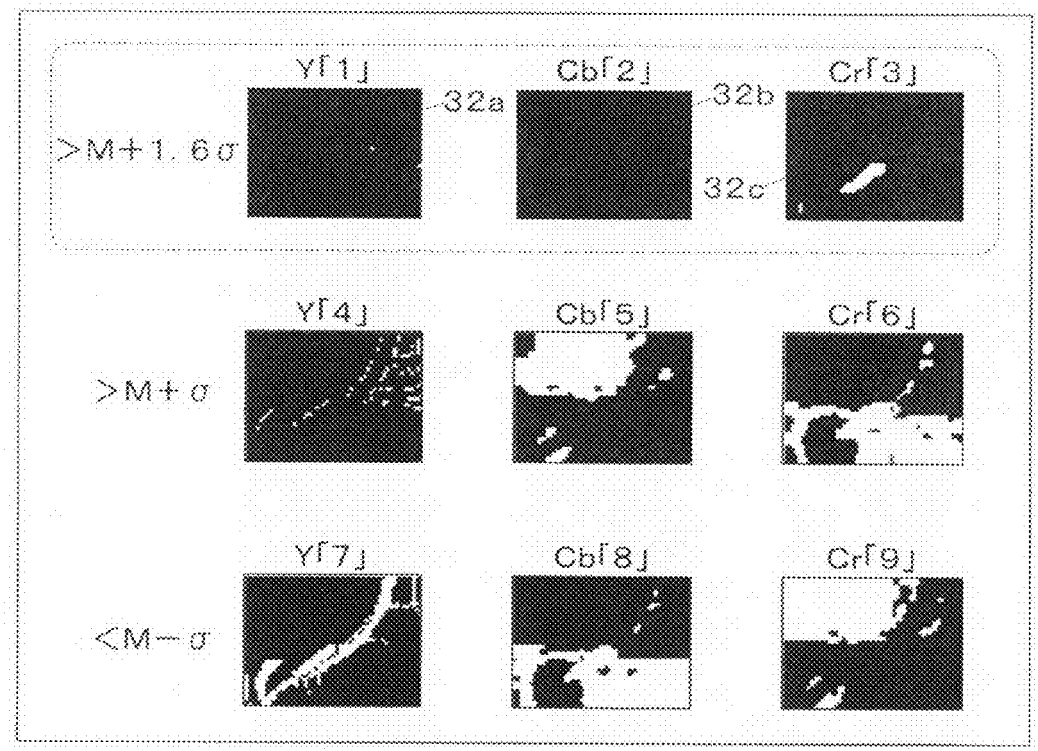
FIG. 32 is a figure showing a concrete example of six binarized images that are used in processing according to a fifth embodiment.
Figure 33:
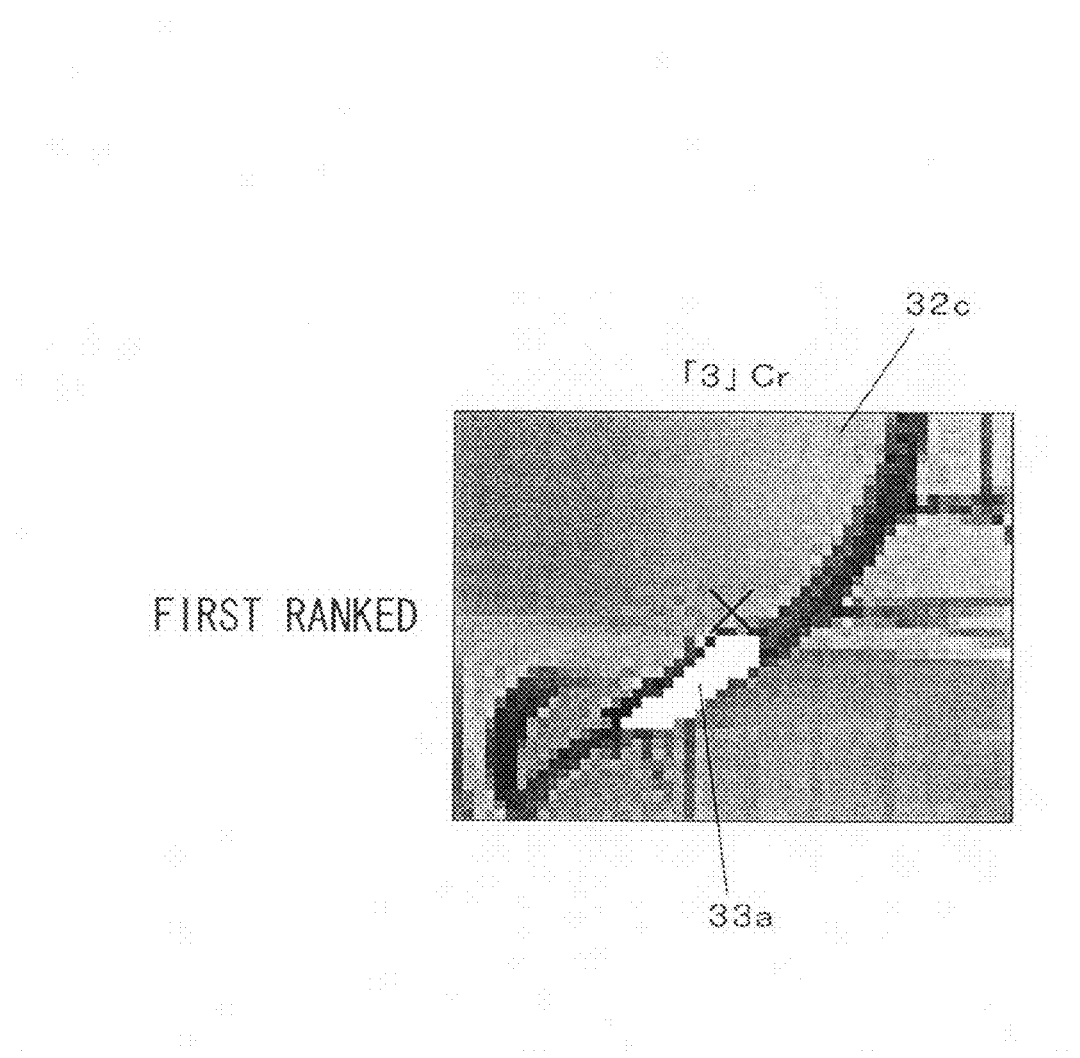
FIG. 33 is a figure showing an example of subject extraction according to this fifth embodiment.

In concrete terms, as shown in FIG. 32, the control unit 104 performs its processing by adding, to the above described three binarized images that were binarized from the Y plane image, the Cr plane image, and the Cb plane image so that their pixels whose pixel values were greater than or equal to their average value Ave+their standard deviation σ became white pixels and the above described three binarized images that were binarized from the Y plane image, the Cr plane image, and the Cb plane image so that their pixels whose pixel values were less than or equal to their average value Ave−their standard deviation σ became white pixels, an additional three binarized images that are binarized therefrom so that their pixels whose pixel values are greater than or equal to their average value Ave−1.6× their standard deviation σ become white pixels. By doing this, as shown in FIG. 33, due to the pixel island 33a that is extracted from within the binarized image 32c, it becomes possible to specify the position of the photographic subject within the photographic image, and its size and shape.

-Variant Embodiments-

It should be understood that the cameras of the embodiments described above may also be varied in the following ways.

Figure 16:
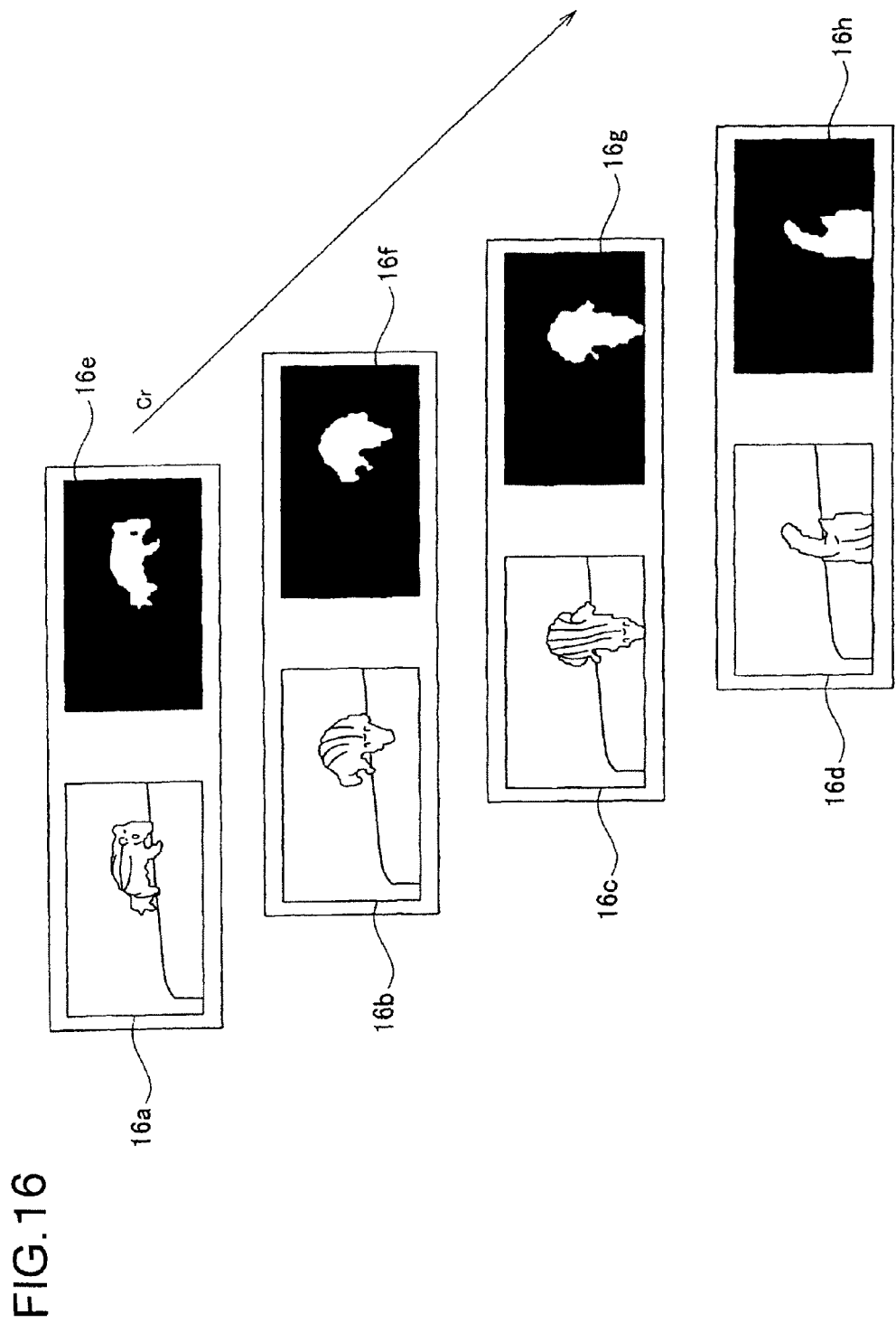
FIG. 16 is a figure schematically showing processing in the case of continuous shooting photography.

(1) If the position, the size, and the shape of a photographic subject are to be specified in a plurality of sequentially shot images that have been acquired by continuous shooting photography, then, apart from the methods disclosed in connection with the first through the fourth embodiments described above, the control unit 104 may also perform the following processing. For example if, as shown in FIG. 16, the images 16a, 16b, 16c, and 16d have been acquired in time series by continuous shooting, then first, using a technique such as that described in the embodiments above, the control unit 104 may perform photographic subject extraction upon the image 16a that is the first frame, thus specifying the position, the size, and the shape of the photographic subject in that image 16a. And since, in the case of continuous shooting, the change in the photographic subject between frames is relatively small, accordingly it will be possible to enhance the processing speed by performing processing for the subsequent frames using only the binarized images for which combination was performed in the step S2600, for example the images 16e through 16h that are binarized from the Cr plane image.

(2) In the first embodiment described above, an example was explained in which the control unit 104 specified the position, the size, and the shape of the photographic subject within the subject image by performing the processing shown in FIG. 4. However, it would also be acceptable to arrange for the control unit 104 to specify at least one of the position, the size, and the shape of the photographic subject within the subject image, only.

(3) In the first embodiment described above, an example was explained in which the control unit 104 eliminated pixel islands for which the probability of being the photographic subject was low from the subjects for further processing, using the secondary evaluation values #1 through #3. However, it would also be acceptable to arrange for the control unit 104 to eliminate pixel islands for which the probability of being the photographic subject was low from the subjects for further processing, using at least one of the secondary evaluation values #1 through #3.

(4) In the first embodiment described above, an example was explained in which, if the subject image is one in which it is possible to detect a face, then, in each of the binarized images, in the step S2400 of FIG. 4, the control unit 104 specifies a first pixel island and also specifies, as being a second pixel island, a pixel island whose ranging target point is closest to that of that first pixel island and moreover that is close upon the screen thereto, and then specifies the position, the size, and the shape of the photographic subject within the subject image by combining the binarized image obtained by extracting the first pixel island and the binarized image obtained by extracting the second pixel island. However, it would also be acceptable to arrange for the control unit 104 to specify at least one of the position, the size, and the shape of the photographic subject, only by combining each of the white pixel regions with combination of a plurality of the candidates extracted in the step S2000 whose main evaluation values are large to combine each of the white pixel regions.

(5) In the first through the fourth embodiments described above, examples were explained in which the main evaluation values were calculated using Equation (5) or Equation (15). However, if the photographic subject is extracted according to a main evaluation value that is calculated according to the calculation equation given by this Equation (5) from a binarized image consisting of a large number of white pixels upon a background, such as for example the binarized image of the sector 21f of FIG. 22, then there is a possibility that tracking of the photographic subject in the second and subsequent frames may become unstable. Thus, in order to avoid this problem, it would also be acceptable to arrange to calculate the main evaluation values while taking into account the areas of the white pixels that do not correspond to any white pixel regions (pixel islands), according to the following Equation (17):

$$\text{main evaluation value} = ([\text{number of white pixels in pixel island}]^\alpha \times \text{number of pixels on screen})/(\text{inertial moment of white pixels taken around barycenter as center} \times \text{number of background pixels}) \quad (17)$$

It should be understood that, in Equation (17), α may be varied in the range of 1.0 to 1.5. Moreover, it is replaced by 1 if the number of background pixels is 0.

(6) In the first through the fourth embodiments described above, cases were explained in which the present invention was applied to a camera. However, the present invention can also be applied to some other type of image processing device that is capable of reading in images and processing them, for example to a personal computer or to a portable terminal or the like. In this case as well, a program that operates in a similar manner to one or more of the embodiments described above may be supplied to the personal computer or the portable terminal as a computer-readable computer program product, in any of various formats.

It should be understood that the present invention is not to be considered as being limited to any of the structures in connection with the embodiments disclosed above, provided that its characteristic function is not lost. Moreover, it would also be acceptable to combine the features of two or more of the embodiments and variant embodiments described above in various ways.

What is claimed is:

1. A photographic subject determination method, comprising:
    a binarization step of creating a plurality of binarized images of a subject image, based upon color information or luminance information in the subject image;
    an evaluation value calculation step of, for each of the plurality of binarized images, calculating an evaluation value that is used for specifying at least one of a position, a size, and a shape of a photographic subject within the subject image, the evaluation value including i) a first evaluation value that is calculated based upon an area of a white pixel region that is made up by white pixels within a binarized image, and a value that shows a state of a set of white pixels within the white pixel region; ii) a second evaluation value that is calculated based upon an area of an enveloping rectangle that envelopes the set of the white pixels within the binarized image and an area of the set of the white pixels; iii) a third evaluation value that is calculated based upon an aspect ratio of the enveloping rectangle; and iv) a fourth evaluation value that is calculated based upon a size of a region that includes a face of a person; and
    a photographic subject specification step of specifying at least one of the position, the size, and the shape of a photographic subject within the subject image, based upon the evaluation value,
    wherein in the photographic subject specification step, from among the plurality of white pixel regions, some of the white pixel regions are eliminated based upon the second evaluation value, the third evaluation value, and the fourth evaluation value, and, from among remaining ones of the white pixel regions, the white pixel regions whose first evaluation value are large are specified as photographic subject candidates.

2. A photographic subject determination method according to claim 1, wherein:
    in the photographic subject specification step, at least one of the position, the size, and the shape of the photographic subject is specified by combining each of white pixel regions that are produced by combining a plurality of candidates, among the photographic subject candidates, whose first evaluation values are large.

3. A photographic subject determination method according to claim 1, wherein:
    the first evaluation value is calculated based upon at least one of the area of the white pixel regions and an inertial moment centered around a photographic subject inferred position within the subject image, an entire area of a screen, and an area of white pixels that do not correspond to the white pixel regions.

4. A photographic subject determination method according to claim 3, wherein:
    a luminance image and a color difference image are created based upon luminance information and color information in the subject image; and
    binarized images are created for the luminance image and the color difference image that have been created to be included in the plurality of binarized images.

5. A photographic subject determination method according to claim 1, wherein:
    the value that shows the state of the set of white pixels within the white pixel region is the area of the white pixel region and an inertial moment around a photographic subject inferred position within the image, and the photographic subject inferred position is either a position designated by a user, or a position in which a face of a photographic subject has been detected.

6. A photographic subject determination method according to claim 5, further comprising:
    an inferring step of inferring a position of an upper half of a body of the photographic subject and a position of a lower half of the body of the photographic subject, based upon the position in which the face of the photographic subject has been detected.

7. A photographic subject determination method according to claim 6, wherein:
in the inferring step, a plurality of positions of the upper half of the body of the photographic subject and a plurality of positions of the lower half of the body of the photographic subject are inferred.

8. A photographic subject determination method according to claim 6, wherein:
in the photographic subject specification step, at least one of the position, the size, and the shape of the photographic subject is specified by combining the white pixel region that corresponds to the position of the upper half of the body of the photographic subject and the white pixel region that corresponds to the position of the lower half of the body of the photographic subject.

9. A photographic subject determination method according to claim 1, wherein:
in the photographic subject specification step, at least one of the position, the size, and the shape of the photographic subject is specified by combining a first white pixel region that corresponds to an inferred photographic subject position, and a second white pixel region whose ranging value is closest to the first white pixel region and that is close thereto upon a screen.

10. A photographic subject determination method according to claim 1, wherein:
hue is classified into a plurality of subdivisions; and
for each subdivision of the plurality of subdivisions into which hue has been classified, a binarized image is created by binarizing the subject image according to pixels that correspond to a corresponding subdivision, and pixels that do not correspond to the corresponding subdivision, so that a plurality of binarized images that are created correspond to the plurality of subdivisions of hue.

11. A photographic subject determination method, comprising:
a binarization step of creating a plurality of binarized images of a subject image, based upon color difference information, luminance information, and color difference space information combined with the color difference information, in the subject image;
an evaluation value calculation step of, for each of the plurality of binarized images, calculating an evaluation value that is used for specifying at least one of a position, a size, and a shape of a photographic subject within the subject image, the evaluation value including i) a first evaluation value that is calculated based upon an area of a white pixel region that is made up by white pixels within a binarized image, and a value that shows a state of a set of white pixels within the white pixel region; ii) a second evaluation value that is calculated based upon an area of an enveloping rectangle that envelopes the set of the white pixels within the binarized image and an area of the set of the white pixels; iii) a third evaluation value that is calculated based upon an aspect ratio of the enveloping rectangle: and iv) a fourth evaluation value that is calculated based upon a size of a region that includes a face of a person; and
a photographic subject specification step of specifying at least one of the position, the size, and the shape of a photographic subject within the subject image, based upon the evaluation value,
wherein in the photographic subject specification step, from among the plurality of white pixel regions, some of the white pixel regions are eliminated based upon the second evaluation value, the third evaluation value, and the fourth evaluation value, and, from among remaining ones of the white pixel regions, the white pixel regions whose first evaluation value are large are specified as photographic subject candidates.

12. A photographic subject determination method according to claim 11, wherein:
a luminance image, a first color difference image, and a second color difference image are created based upon luminance information and color information in the subject image;
binarized images are created for the luminance image, the first color difference image, and the second color difference image that have been created to be included in the plurality of binarized images; and
a color difference space achieved by a first color difference of the first color difference image and a second color difference of the second color difference image is subdivided into a plurality of color difference space subdivisions, and the plurality of binarized images are created by creating binarized images corresponding to the color difference space subdivisions, using the first color difference image and the second color difference image.

13. A non-transitory computer-readable medium storing a computer program that, when executed by at least one processor, causes a computer to execute a photographic subject determination method according to claim 1.

14. A non-transitory computer-readable medium storing a computer program that, when executed by at least one processor, causes a computer to execute a photographic subject determination method according to claim 11.

15. A camera, comprising a control unit that performs a photographic subject determination method according to claim 1.

16. A camera, comprising a control unit that performs a photographic subject determination method according to claim 11.

* * * * *